United States Patent
Mei et al.

(10) Patent No.: US 12,391,809 B2
(45) Date of Patent: Aug. 19, 2025

(54) PVDF THIN FILMS HAVING HIGH ELECTROMECHANICAL EFFICIENCY AND A GEL CASTING METHOD FOR FORMING SAME

(71) Applicant: META PLATFORMS TECHNOLOGIES, LLC, Menlo Park, CA (US)

(72) Inventors: Hao Mei, Redmond, WA (US); Sheng Ye, Redmond, WA (US); Christopher Yuan Ting Liao, Seattle, WA (US); Jonathan Robert Peterson, Woodinville, WA (US); Rongzhi Huang, Sammamish, WA (US); Arman Boromand, Issaquah, WA (US); Andrew John Ouderkirk, Kirkland, WA (US); Taha Masood, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 746 days.

(21) Appl. No.: 17/736,792

(22) Filed: May 4, 2022

(65) Prior Publication Data
US 2023/0116775 A1    Apr. 13, 2023

Related U.S. Application Data

(60) Provisional application No. 63/254,451, filed on Oct. 11, 2021.

(51) Int. Cl.
*C08J 5/18* (2006.01)
*B29C 43/24* (2006.01)
(Continued)

(52) U.S. Cl.
CPC .................. *C08J 5/18* (2013.01); *B29C 43/24* (2013.01); *B29C 48/0018* (2019.02);
(Continued)

(58) Field of Classification Search
CPC ......... C08J 5/18; C08J 2327/22; B29C 48/08; B29C 48/0018; B29C 43/24; B29C 55/005; B29C 71/0081; B29K 2027/16
(Continued)

(56) References Cited

U.S. PATENT DOCUMENTS

2020/0309995 A1    10/2020    Wells et al.

FOREIGN PATENT DOCUMENTS

EP            0703266 A1     3/1996
WO        2020012660 A1     1/2020

OTHER PUBLICATIONS

International Preliminary Report on Patentability for International Application No. PCT/US2022/046158, mailed Apr. 25, 2024, 10 pages.
(Continued)

*Primary Examiner* — Anita Nassiri-Motlagh
(74) *Attorney, Agent, or Firm* — Greenberg Traurig, LLP

(57) ABSTRACT

A mechanically and piezoelectrically anisotropic polymer thin film may be formed by gel casting a solution that includes a crystallizable polymer and a liquid solvent. The solvent may be configured to interact with the polymer to facilitate chain alignment and, in some examples, create a higher crystalline content within the cast thin film. The thin film may also include up to approximately 90 wt. % of an additive and may be characterized by a bimodal molecular weight distribution of a crystallizable polymer where the molecular weight of the additive may be less than the molecular weight of the crystallizable polymer. In some examples, the polymer(s) and the additive(s) may be inde-
(Continued)

pendently selected from vinylidene fluoride, trifluoroethylene, chlorotrifluoroethylene, hexafluoropropene, vinyl fluoride, etc. The anisotropic polymer thin film may be characterized by an electromechanical coupling factor ($k_{31}$) of at least 0.1.

9 Claims, 10 Drawing Sheets

(51) Int. Cl.
*B29C 48/00* (2019.01)
*B29C 48/08* (2019.01)
*B29C 55/00* (2006.01)
*B29C 71/00* (2006.01)
*B29K 27/00* (2006.01)

(52) U.S. Cl.
CPC ............ *B29C 48/08* (2019.02); *B29C 55/005* (2013.01); *B29C 71/0081* (2013.01); *B29K 2027/16* (2013.01); *C08J 2327/22* (2013.01)

(58) Field of Classification Search
USPC .................................................. 252/62.9 R
See application file for complete search history.

(56) References Cited

OTHER PUBLICATIONS

Baur C., et al., "Enhanced Piezoelectric Performance from Carbon Fluoropolymer Nanocomposites," Journal of Applied Physics, Dec. 15, 2012, vol. 112, No. 12, 7 pages.
International Search Report and Written Opinion for International Application No. PCT/US2022/046158, mailed Jan. 20, 2023, 13 pages.
Kunstler W., et al. "Preparation and Assessment of Piezo- and Pyroelectric Poly (Vinylidene Fluoride-Hexafluoropropylene) Copolymer Films," Appl., Phys., vol. 73, No. 5, Nov. 1, 2011, pp. 641-645.
Martins P., et al., "Electroactive Phases of Poly (Vinylidene Fluoride): Determination, Processing and Applications," Progress in Polymer Science, Jan. 1, 2014, vol. 39, No. 4, pp. 683-706.
Martins P., et al., "Role of Nanoparticle Surface Charge on the Nucleation of the Electroactive [beta]-Poly (vinylidene fluoride) Nanocomposites for Sensor and Actuator Applications," The Journal of Physical Chemistry C, vol. 116, No. 29, Jul. 26, 2012, pp. 15790-15794.
Shah D., et al., "Dramatic Enhancements in Toughness of Polyvinylidene Fluoride Nanocomposites via Nanoclay-Directed Crystal Structure and Morphology," Advanced Materials, VCH Publishers, vol. 16, No. 14, Jul. 19, 2004, pp. 1173-1177.

PVDF THIN FILMS HAVING HIGH ELECTROMECHANICAL EFFICIENCY AND A GEL CASTING METHOD FOR FORMING SAME

CROSS-REFERENCE TO RELATED APPLICATION

This application claims the benefit of priority under 35 U.S.C. § 119(e) of U.S. Provisional Application No. 63/254,451, filed Oct. 11, 2021, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
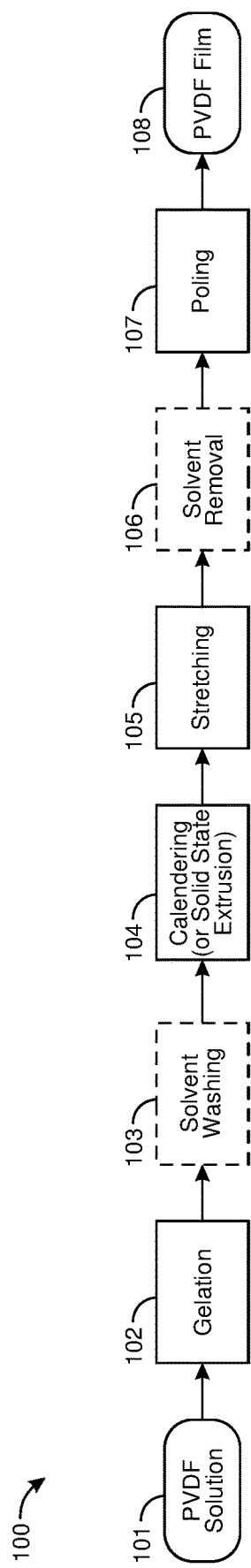
FIG. 1 is a flow chart of an example gel casting method for forming a PVDF polymer thin film having high electromechanical efficiency according to various embodiments.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer materials may be incorporated into a variety of different optic and electro-optic systems, including active and passive optics and electroactive devices. Lightweight and conformable, one or more polymer layers may be incorporated into wearable devices such as smart glasses and are attractive candidates for emerging technologies including virtual reality/augmented reality devices where a comfortable, adjustable form factor is desired.

Virtual reality (VR) and augmented reality (AR) eyewear devices or headsets, for instance, may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or augmented reality (AR) overlay. VR/AR eyewear devices and headsets may be used for a variety of purposes. Governments may use such devices for military training, medical professionals may use such devices to simulate surgery, and engineers may use such devices as design visualization aids.

These and other applications may leverage one or more characteristics of thin film polymer materials, including piezoelectric properties to induce deformations and the refractive index to manipulate light. In various applications, optical elements and other components may include polymer thin films that have anisotropic mechanical and/or optical properties. The degree of optical or mechanical anisotropy achievable through conventional thin film manufacturing processes is typically limited, however, and is often exchanged for competing thin film properties such as flatness, toughness and/or film strength. For example, highly anisotropic polymer thin films often exhibit low strength in one or more in-plane direction, which may challenge manufacturability and limit performance.

According to some embodiments, oriented piezoelectric polymer thin films may be implemented as an actuatable lens substrate in an optical element such as a liquid lens. Uniaxially-oriented polyvinylidene fluoride (PVDF) thin films, for example, may be used to generate an advantageously anisotropic strain map across the field of view of a lens. However, a low piezoelectric response and/or lack of sufficient optical quality may impede the implementation of PVDF thin films as an actuatable layer.

Notwithstanding recent developments, it would be advantageous to provide optical quality, mechanically robust, and mechanically and piezoelectrically anisotropic polymer thin films that may be incorporated into various optical systems including display systems for artificial reality applications. The instant disclosure is thus directed generally to optical quality polymer thin films having a high piezoelectric response and their methods of manufacture, and more specifically to a gel casting method for forming PVDF-based polymer materials having a high electromechanical efficiency.

The refractive index and piezoelectric response of a polymer thin film may be determined by its chemical composition, the chemical structure of the polymer repeat unit, its density and extent of crystallinity, as well as the alignment of the crystals and/or polymer chains. Among these factors, the crystal or polymer chain alignment may dominate. In crystalline or semi-crystalline polymer thin films, the piezoelectric response may be correlated to the degree or extent of crystal orientation, whereas the degree or extent of chain alignment may create comparable piezoelectric response in an amorphous phase within a polymer thin film.

An applied stress may be used to create a preferred alignment of crystals or polymer chains within a polymer thin film and induce a corresponding modification of the refractive index and piezoelectric response along different directions of the film. As disclosed further herein, during processing where a polymer thin film is stretched to induce a preferred alignment of crystals/polymer chains and an attendant modification of the refractive index and piezoelectric response, Applicants have shown that a gel casting method and the choice of an associated liquid solvent can decrease the propensity for polymer chain entanglement within the cast thin film.

In accordance with particular embodiments, Applicants have developed a polymer thin film manufacturing method for forming an optical quality PVDF-based polymer thin film having a desired piezoelectric response. Whereas in PVDF and related polymers, the total extent of crystallization as well as the alignment of crystals may be limited due to polymer chain entanglement, as disclosed herein a gel casting method may facilitate the disentanglement and alignment of polymer chains, which may lead to improvements in the optical quality of a polymer thin film as well as its piezoelectric response.

A polymer thin film may be formed by gel casting from a polymer solution. A polymer solution may include one or more crystallizable polymers, one or more additives, and one or more liquid solvents. Gel casting, which may provide control of one or more of the polymer composition and concentration, choice and concentration of liquid solvent, and casting temperature, for example, may facilitate decreased entanglement of polymer chains and allow the polymer film to achieve a higher stretch ratio during a later deformation step. In some cases, one or more low molecular weight additives may be added to the polymer solution. The molecular weight distribution of the one or more crystallizable polymers and the additive(s) may be respectively mono-disperse, bimodal, or polydisperse.

PVDF-based polymer thin films may be formed using a crystallizable polymer. Example crystallizable polymers may include moieties such as vinylidene fluoride (VDF), trifluoroethylene (TrFE), chlorotrifluoroethylene (CTFE), hexafluoropropene (HFP), and vinyl fluoride (VF). As used herein, one or more of the foregoing "PVDF-family" moieties may be combined with a low molecular weight additive to form an anisotropic polymer thin film. Reference herein to a PVDF thin film includes reference to any PVDF-family member-containing polymer thin film unless the context clearly indicates otherwise.

The crystallizable polymer component of such a PVDF thin film may have a molecular weight ("high molecular weight") of at least approximately 100,000 g/mol, e.g., at least approximately 100,000 g/mol, at least approximately 150,000 g/mol, at least approximately 200,000 g/mol, at least approximately 250,000 g/mol, at least approximately 300,000 g/mol, at least approximately 350,000 g/mol, at least approximately 400,000 g/mol, at least approximately 450,000 g/mol, or at least approximately 500,000 g/mol, including ranges between any of the foregoing values.

If provided, a "low molecular weight" additive may have a molecular weight of less than approximately 200,000 g/mol, e.g., less than approximately 200,000 g/mol, less than approximately 100,000 g/mol, less than approximately 50,000 g/mol, less than approximately 25,000 g/mol, less than approximately 10,000 g/mol, less than approximately 5000 g/mol, less than approximately 2000 g/mol, less than approximately 1000 g/mol, less than approximately 500 g/mol, less than approximately 200 g/mol, or less than approximately 100 g/mol, including ranges between any of the foregoing values.

Example low molecular weight additives may include oligomers and polymers of vinylidene fluoride (VDF), trifluoroethylene (TrFE), chlorotrifluoroethylene (CTFE), hexafluoropropene (HFP), and vinyl fluoride (VF), as well as homopolymers, co-polymers, tri-polymers, derivatives, and combinations thereof. Such additives may be readily soluble in, and provide refractive index matching with, the high molecular weight component. For example, a low molecular weight additive may have a refractive index measured at 652.9 nm of from approximately 1.38 to approximately 1.55.

The molecular weight of the low molecular weight additive may be less than the molecular weight of the crystallizable polymer. According to one example, the crystallizable polymer may have a molecular weight of at least approximately 100,000 g/mol and the additive may have a molecular weight of less than approximately 25,000 g/mol. According to a further example, the crystallizable polymer may have a molecular weight of at least approximately 300,000 g/mol and the additive may have a molecular weight of less than approximately 200,000 g/mol. According to a particular example, the crystallizable polymer may have a molecular weight of approximately 600,000 g/mol and the additive may have a molecular weight of approximately 150,000 g/mol. Use herein of the term molecular weight may, in some examples, refer to a weight average molecular weight.

Further example low molecular weight additives may include oligomers and polymers that may have polar interactions with PVDF-family member chains. Such oligomers and polymers may include ester, ether, hydroxyl, phosphate, fluorine, halogen, or nitrile groups. Particular examples include polymethylmethacrylate, polyethylene glycol, and polyvinyl acetate. PVDF polymer and PVDF oligomer-based additives, for example, may include a reactive group such as vinyl, acrylate, methacrylate, epoxy, isocyanate, hydroxyl, or amine, and the like. Such additives may be cured in situ, i.e., within a polymer thin film, by applying one or more of heat or light or by reaction with a suitable catalyst.

Such an oligomeric or polymeric low molecular weight additive may constitute from approximately 0.1 wt. % to approximately 90 wt. % of the polymer thin film, e.g., 0.1 wt. %, 0.2 wt. %, 0.5 wt. %, 1 wt. %, 2 wt. %, 5 wt. %, 10 wt. %, 20 wt. %, 30 wt. %, 40 wt. %, 50 wt. %, 60 wt. %, 70 wt. %, 80 wt. %, or 90 wt. %, including ranges between any of the foregoing values.

Still further example polar additives may include ionic liquids, such as 1-octadecyl-3-methylimidazolium bromide, 1-butyl-3-methylimidazolium[$PF_6$], 1-butyl-3-methylimidazolium[$BF_4$], 1-butyl-3-methylimidazolium[$FeCl_4$] or 1-butyl-3-methylimidazolium[Cl]. According to some embodiments, the amount of an ionic liquid may range from approximately 1 to 15 wt. % of the anisotropic polymer thin film.

In some examples, the low molecular weight additive may include an inorganic compound. An inorganic additive may promote a higher crystalline content and increase the piezoelectric performance of the anisotropic polymer thin film. Example inorganic additives may include nanoparticles (e.g., calcium fluoride, ceramic nanoparticles such as PZT, BNT, or quartz; or metal or metal oxide nanoparticles), ferrite nanocomposites (e.g., $Fe_2O_3$—$CoFe_2O_4$), and hydrated salts or metal halides, such as LiCl, $Al(NO_3)_3$-

9H₂O, BiCl$_3$, Ce or Y nitrate hexahydrate, or Mg chlorate hexahydrate. Further nucleation agents include carbon nanotubes, graphene, graphene oxide, nanoscale clays, silver nanoparticles, and the like. In some examples, a nanoparticle surface may be treated, such as by exposure to difluorosilane, to improve compatibility with PVDF. The amount of an inorganic additive may range from approximately 0.001 wt. % to approximately 5 wt. % of the anisotropic polymer thin film. Example additives include piezoelectric ceramic particles. The average particle size of an inorganic additive may be less than approximately 1 micrometer, e.g., less than approximately 500 nm, less than approximately 200 nm, or less than approximately 100 nm, including ranges between any of the foregoing values.

In some embodiments, an additive may include one or more of a nucleation agent and a cation. A nucleation agent may promote a higher crystalline content. Example nucleation agents include amides, such as 1,3,5-benzenetricarboxamide; N,N'-bis[2-(2-aminoethyl)octadecanoyl] decanediamide; 2-N,6-N-dicyclohexylnaphthalene-2,6-dicarboxamide, N-alkyl toluene sulfonamide, and the like.

Further example nucleation agents may include ionic compounds, such as tetrabutylphosphonium hexafluorophosphate, ethyltriphenylphosphonium bromide, n-heptyltriphenylphosphonium bromide, N-acetonylpyridinium bromide, 1-butyl-1-methyl-pyrrolidinium bromide, tetrabutylammonium hydrogen sulfate, triphenylsulfonium tetrafluoroborate, sodium lauryl sulfate, sodium n-tridecyl sulfate, 1-naphthyl phosphate monosodium salt monohydrate, and the like. An example nucleating agent having a neutral surface charge includes flavanthone.

Generally, a low molecular weight additive may constitute up to approximately 90 wt. % of the polymer thin film, e.g., approximately 0.001 wt. %, approximately 0.002 wt. %, approximately 0.005 wt. %, approximately 0.01 wt. %, approximately 0.02 wt. %, approximately 0.05 wt. %, approximately 0.1 wt. %, approximately 0.2 wt. %, approximately 0.5 wt. %, approximately 1 wt. %, approximately 2 wt. %, approximately 5 wt. %, approximately 10 wt. %, approximately 20 wt. %, approximately 30 wt. %, approximately 40 wt. %, approximately 50 wt. %, approximately 60 wt. %, approximately 70 wt. %, approximately 80 wt. %, or approximately 90 wt. %, including ranges between any of the foregoing values.

In some embodiments, one or more additives may be used. According to particular examples, an original additive may be used during processing of a thin film (e.g., during gel casting, stretching, and/or poling). Thereafter, the original additive may be removed and replaced by a secondary additive. Micro and macro voids produced during solvent removal or stretching process may be filled by the secondary additive, for example. A secondary additive may be index-matched to the crystalline polymer and may, for example, have a refractive index ranging from approximately 1.38 to approximately 1.55. A secondary additive may be added by soaking the thin film in a melting condition or in a solvent bath or by calendering the thin film with the secondary additive. A secondary additive may have a melting point of less than approximately 160° C., e.g., less than 160° C., less than 140° C., or less than 120° C.

In some embodiments, an anisotropic polymer thin film may include an antioxidant. Example antioxidants include hindered phenols, phosphites, thiosynergists, hydroxylamines, and oligomer hindered amine light stabilizers (HALS).

In particular embodiments, an additive may be adapted to decrease discoloring (i.e., yellowing) caused by solvent-induced degradation of PVDF. That is, a high polarity solvent may induce defluorination reactions that create carbon-carbon double bonds and an attendant yellowing of the solution as well as the resulting polymer thin film. An acidic additive may prevent defluorination reactions and accordingly inhibit yellowing. Example acidic additives include organic and inorganic materials that may be incorporated into the solution in an amount ranging from approximately 0.001 wt. % to approximately 20 wt. %, e.g., 0.001, 0.002, 0.005, 0.01, 0.02, 0.05, 0.1, 0.2, 0.5, 1, 2, 5, 10, or 20 wt. %, including ranges between any of the foregoing values. Example acidic additives include hydrochloric acid, nitric acid, sulfuric acid, benzoic acid, malonic acid, citric acid, adipic acid, lactic acid, acetic acid, formic acid, oxalic acid, tartaric acid, propanoic acid, butanoic acid, sorbic acid, fumaric acid, as well as mixtures thereof. Optionally, an acidic additive may be removed from the resulting polymer thin film.

In particular embodiments, additives used for discoloring may react with carbon-carbon double bond-containing species, such as thiols. Thiols may include small molecules and/or polymers with thiol functional groups. Thiols may be added in an amount ranging from approximately 0.001 wt. % to approximately 20 wt. %, e.g., 0.001, 0.002, 0.005, 0.01, 0.02, 0.05, 0.1, 0.2, 0.5, 1, 2, 5, 10, or 20 wt. %, including ranges between any of the foregoing values.

The choice of liquid solvent may affect the maximum crystallinity and percent beta phase content of a PVDF-based polymer thin film. In addition, the polarity of the solvent may impact the critical polymer concentration (c*) for polymer chains to entangle in solution. The liquid solvent (i.e., "solvent") may include a single solvent composition or a mixture of different solvents. In some embodiments, the solubility of the crystallizable polymer in the liquid solvent may be at least approximately 0.1 g/100 g (e.g., 1 g/100 g or 10 g/100 g) at a temperature of 25° C. or more (e.g., 50° C., 75° C., 100° C., or 150° C.).

Example liquid solvents include, but are not limited to, dimethylformamide (DMF), cyclohexanone, dimethylacetamide (DMAc), diacetone alcohol, di-isobutyl ketone, tetramethyl urea, ethyl acetoacetate, dimethyl sulfoxide (DMSO), trimethyl phosphate, N-methyl-2-pyrrolidone (NMP), butyrolactone, isophorone, triethyl phosphate, carbitol acetate, propylene carbonate, glyceryl triacetate, dimethyl phthalate, acetone, tetrahydrofuran (THF), methyl ethyl ketone, methyl isobutyl ketone, glycol ethers, glycol ether esters, and N-butyl acetate.

A polymer gel may be obtained from the polymer solution by evaporating the solvent, cooling the polymer solution, adding a relatively poor solvent to the polymer solution, or a combination thereof. The solubility of the crystalline polymer in a poor solvent may be less than 20 g/100 g, e.g., 5 g/100 g or 1 g/100 g at a temperature of less than approximately 150° C., e.g., 75° C., 25° C., 0° C., −40° C., or −70° C. The polymer gel, which includes a mixture of the crystallizable polymer and the liquid solvent, may be transparent, translucent, or opaque. Following gelation and prior to calendering, a polymer gel may be washed with a secondary solvent, which may replace the original solvent. A solvent evaporation step may be used to partially or completely remove the original solvent and/or the secondary solvent.

An anisotropic polymer thin film may be formed by applying a stress to the polymer gel, i.e., a polymer thin film containing the polymer gel. According to some examples, a solid state extrusion process may be used to orient the polymer chains and form a polymer thin film. According to further examples, a calendering process may be used to orient polymer chains in the gel at room temperature or at elevated temperature. The solvent may be partially or fully removed before, during, or after stretching and orienting. Stretching and the associated chain/crystal alignment may be followed by poling to form a polymer thin film having a high electromechanical efficiency.

A calendering process may be applied to the dried or partially dried gel before stretching. The gel may be calendered several times with a progressively decreasing roller gap to achieve a target thickness. During the calendering process, any residual solvent may be removed. The calendering process can be performed at room temperature and/or at a temperature no higher than approximately 150° C., e.g., 130° C., 110° C., 90° C., 70° C., or 50° C. The polymer may be stretched to a stretch ratio of at least approximately 1.5, e.g., 2, 2.5, 3, 3.5, 4, 4.5, 5, 5.5, 6, 7, 8, 9, 10, 15, 20, 30, or 50, including ranges between any of the foregoing values.

In an example process, a dried or substantially dried polymer material may be hot pressed to form a desired shape that is fed through a solid state extrusion system (i.e., extruder) at a suitable extrusion temperature. A solid state extruder may include a bifurcated nozzle, for example. The temperature for hot pressing and the extrusion temperature may each be less than approximately 190° C. That is, the hot pressing temperature and the extrusion temperature may be independently selected from 180° C., 170° C., 160° C., 150° C., 140° C., 130° C., 120° C., 110° C., 100° C., 90° C., or 80° C., including ranges between any of the foregoing values. According to particular embodiments, the extruded polymer material may be stretched further, e.g., using a post-extrusion, uniaxial or biaxial stretch process.

Stretching may include a single act of stretching or plural, successive stretching events, such as along different in-plane directions of a polymer thin film. The act of stretching may be velocity limited or strain rate limited. In some embodiments, a polymer thin film may be stretched at a variable or constant velocity. In some embodiments, the polymer thin film may be stretched using a variable strain rate or a constant strain rate (e.g., 0.5/sec, 1/sec, 5/sec, or 10/sec, including ranges between any of the foregoing values). By way of example, the strain rate may decrease throughout an act of stretching and/or amongst different stretching events from an initial strain rate (e.g., 5/sec) to a final strain rate (e.g., 0.5/sec).

Some stretching processes may include two successive stretching events. For instance, orthogonal consecutive stretching (OCS) may be used to develop structural fingerprints, such as smaller lamellar thicknesses and higher degrees of polymer chain orientation at draw ratios less than the draw ratios used to achieve similar structural fingerprints via comparative single stretching (SS) or parallel consecutive stretching (PCS) techniques. Orthogonal consecutive stretching may include first stretching a polymer thin film along a first in-plane axis, and then subsequently stretching the polymer thin film along a second in-plane axis that is orthogonal to the first in-plane axis.

In an example method, a cast polymer thin film may be stretched along a first in-plane axis to a stretch ratio of up to approximately 4 (e.g., 2, 3, or 4, including ranges between any of the foregoing values) with an attendant relaxation in the cross-stretch direction having a relaxation ratio of at least approximately 0.2 (e.g., 0.2, 0.3, 0.4, or 0.5, including ranges between any of the foregoing values). Subsequently, the polymer thin film may be stretched along a second in-plane axis orthogonal to the first in-plane axis to a stretch ratio of at least approximately 7 (e.g., 7, 10, 20, 30, 40, 50, or 60, including ranges between any of the foregoing values) with a relaxation ratio in the cross-stretch direction of at least approximately 0.2 (e.g., 0.2, 0.3, 0.4, or 0.5, including ranges between any of the foregoing values).

In some examples, the draw ratio in the first stretching step may be less than the draw ratio in the second stretching step. According to further embodiments, the temperature of the polymer thin film during the second stretching step may be greater than the polymer thin film temperature during the first stretching step. The temperature during the second stretching step may be at least approximately 5° C. greater than the temperature during the first stretching step (e.g., 5, 10, 15, or 20° C. greater, including ranges between any of the foregoing values).

In some embodiments, a polymer thin film may be heated and stretched along a first direction, cooled, and then heated and stretched along a second direction. In some embodiments, a polymer thin film may be heated and stretched along a first direction, cooled, and then heated and stretched again along the first direction. Following the second stretching step, the polymer thin film may be cooled. The acts of cooling may immediately follow the first (or second) stretching steps, where the polymer thin film may be cooled within approximately 10 seconds following completion of the first (or second) stretching step.

Cooling may stabilize the microstructure of the stretched polymer thin film. In some examples, the temperature of the polymer thin film during an act of stretching may be greater than the glass transition temperature of the crystallizable polymer. In some examples, the temperature of the polymer thin film during an act of stretching may be less than, equal to, or greater than the melting onset temperature of the crystallizable polymer.

In various examples, the extent of relaxation perpendicular to the stretch direction may be approximately equal to the square root of the stretch ratio in the stretch direction. In some embodiments, the extent of relaxation may be substantially constant throughout the stretching process(es). In further embodiments, the extent of relaxation may decrease, with greater relaxation associated with the beginning of a stretch step and lesser relaxation associated with the end of a stretch step.

After extrusion or casting, a PVDF film may be oriented either uniaxially or biaxially as a single layer or multilayer to form a mechanically anisotropic and optically clear film. An anisotropic polymer thin film may be formed using a thin film orientation system configured to heat and stretch a polymer thin film in at least one in-plane direction in one or more distinct regions thereof. In some embodiments, a thin film orientation system may be configured to stretch a polymer thin film, i.e., a crystallizable polymer thin film, along only one in-plane direction. For instance, a thin film orientation system may be configured to apply an in-plane stress to a polymer thin film along the x-direction while allowing the thin film to relax along an orthogonal in-plane direction (e.g., along the y-direction). As used herein, the relaxation of a polymer thin film may, in certain examples, accompany the absence of an applied stress along a relaxation direction.

According to some embodiments, within an example orientation system, a polymer thin film may be heated and stretched transversely to a direction of film travel through the system. In such embodiments, a polymer thin film may be held along opposing edges by plural movable clips slidably disposed along a diverging track system such that the polymer thin film is stretched in a transverse direction (TD) as it moves along a machine direction (MD) through heating and deformation zones of the thin film orientation system. In some embodiments, the stretching rate in the transverse direction and the relaxation rate in the machine direction may be independently and locally controlled. In certain embodiments, large scale production may be enabled, for example, using a roll-to-roll manufacturing platform.

In certain aspects, the tensile stress may be applied uniformly or non-uniformly along a lengthwise or widthwise dimension of the polymer thin film. Heating of the polymer thin film may accompany the application of the tensile stress. For instance, a semi-crystalline polymer thin film may be heated to a temperature greater than room temperature (~23° C.) to facilitate deformation of the thin film and the formation and realignment of crystals and/or polymer chains therein.

The temperature of the polymer thin film may be maintained at a desired value or within a desired range before, during and/or after the act of stretching, i.e., within a pre-heating zone or a deformation zone downstream of the pre-heating zone, in order to improve the deformability of the polymer thin film relative to an un-heated polymer thin film. The temperature of the polymer thin film within a deformation zone may be less than, equal to, or greater than the temperature of the polymer thin film within a pre-heating zone.

In some embodiments, the polymer thin film may be heated to a constant temperature throughout the act of stretching. In some embodiments, a region of the polymer thin film may be heated to different temperatures, i.e., during and/or subsequent to the application of a tensile stress. In some embodiments, different regions of the polymer thin film may be heated to different temperatures. In certain embodiments, the strain realized in response to the applied tensile stress may be at least approximately 20%, e.g., approximately 20%, approximately 50%, approximately 100%, approximately 200%, approximately 400%, approximately 500%, approximately 1000%, approximately 2000%, approximately 3000%, or approximately 4000% or more, including ranges between any of the foregoing values.

Following the act(s) of stretching, one or more thin film properties may be refined through hot pressing or hot calendering. Uniaxial hot pressing, for example, may be performed in a rigid die with loading applied along a common axis. Some pressing systems may include a graphite die, which may be enclosed in a protective atmosphere or vacuum chamber. During hot pressing, temperature and pressure may be applied simultaneously to the stretched polymer thin film. Heating may be achieved using induction coils that surround the graphite die, and pressure may be applied hydraulically. Calendering is a process of compressing a thin film during production by passing a polymer thin film between one or more pairs of heated rollers.

In some embodiments, a stretched polymer thin film may be pressed or calendered to at least approximately 50% of its initial thickness (e.g., 50%, 60%, 70%, or 80% of its initial thickness, including ranges between any of the foregoing values) under an applied pressure of at least approximately 2 MPa (e.g., 2, 3, 4, 5, or 10 MPa, including ranges between any of the foregoing values) and at a temperature of less than approximately 140° C. (e.g., 120° C., 125° C., 130° C., or 135° C., including ranges between any of the foregoing values).

A pressed or calendered polymer thin film may have a thickness of less than approximately 500 micrometers, e.g., less than 400 micrometers, less than 300 micrometers, or less than 200 micrometers. According to some embodiments, following hot pressing or hot calendering, a polymer thin film may be stretched further using one or more additional stretching steps. In a post-hot pressing or post-hot calendering stretching step, a polymer thin film may be stretched to a draw ratio of approximately 5 or greater (e.g., 5, 10, 20, 40, 60, 80, 100, 120, or 140, including ranges between any of the foregoing values).

Hot pressing or hot calendering may increase the transmissivity of a polymer thin film. According to some embodiments, the applied pressure may collapse voids within the polymer thin film, thus decreasing the overall void volume and increasing the density of the polymer matrix.

Following deformation of the polymer thin film, the heating may be maintained for a predetermined amount of time, followed by cooling of the polymer thin film. The act of cooling may include allowing the polymer thin film to cool naturally, at a set cooling rate, or by quenching, such as by purging with a low temperature gas, which may thermally stabilize the polymer thin film.

Following deformation, the crystals or chains may be at least partially aligned with the direction of the applied tensile stress. As such, a polymer thin film may exhibit a high degree of optical clarity and mechanical anisotropy.

The presently disclosed anisotropic PVDF-based polymer thin films may be characterized as optical quality polymer thin films and may form, or be incorporated into, an optical element such as an actuatable layer. Optical elements may be used in various display devices, such as virtual reality (VR) and augmented reality (AR) glasses and headsets. The efficiency of these and other optical elements may depend on the degree of optical clarity and/or piezoelectric response.

According to various embodiments, an "optical quality" thin film may, in some examples, be characterized by a transmissivity within the visible light spectrum of at least approximately 20%, e.g., 20, 30, 40, 50, 60, 70, 80, 90 or 95%, including ranges between any of the foregoing values, and less than approximately 10% bulk haze, e.g., 0, 1, 2, 4, 6, or 8% bulk haze, including ranges between any of the foregoing values. Transparent materials will typically exhibit very low optical absorption and minimal optical scattering.

As used herein, the terms "haze" and "clarity" may refer to an optical phenomenon associated with the transmission of light through a material, and may be attributed, for example, to the refraction of light within the material, e.g., due to secondary phases or porosity and/or the reflection of light from one or more surfaces of the material. As will be appreciated by those skilled in the art, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

In further embodiments, an optical quality PVDF-based polymer thin film may be incorporated into a multilayer structure, such as the "A" layer in an ABAB multilayer. Further multilayer architectures may include AB, ABA, or ABC configurations. Each B layer (and each C layer, if provided) may include a further polymer composition, such as polyethylene. According to some embodiments, the B (and C) layer(s) may be electrically conductive and may include, for example, indium tin oxide (ITO) or poly(3,4-ethylenedioxythiophene).

In a single layer or multilayer architecture, each PVDF-family layer may have a thickness ranging from approximately 100 nm to approximately 5 mm, e.g., 100, 200, 500, 1000, 2000, 5000, 10000, 20000, 50000, 100000, 200000, 500000, 1000000, 2000000, or 5000000 nm, including ranges between any of the foregoing values. A multilayer stack may include two or more such layers. In some embodiments, a density of a PVDF layer or thin film may range from approximately 1.7 g/cm$^3$ to approximately 1.9 g/cm$^3$, e.g., 1.7, 1.75, 1.8, 1.85, or 1.9 g/cm$^3$, including ranges between any of the foregoing values.

According to some embodiments, the areal dimensions (i.e., length and width) of an anisotropic PVDF-family polymer thin film may independently range from approximately 5 cm to approximately 50 cm or more, e.g., 5, 10, 20, 30, 40, or 50 cm, including ranges between any of the foregoing values. Example anisotropic polymer thin films may have areal dimensions of approximately 5 cm×5 cm, 10 cm×10 cm, 20 cm×20 cm, 50 cm×50 cm, 5 cm×10 cm, 10 cm×20 cm, 10 cm×50 cm, etc.

As used herein, the terms "polymer thin film" and "polymer layer" may be used interchangeably. Furthermore, reference to a "polymer thin film" or a "polymer layer" may include reference to a "multilayer polymer thin film" unless the context clearly indicates otherwise.

In accordance with various embodiments, a polymer composition used to form an anisotropic polymer thin film may include a crystallizable polymer and a low molecular weight additive. Without wishing to be bound by theory, one or more low molecular weight additives may interact with high molecular weight polymers throughout casting and stretch processes to facilitate less chain entanglement and better chain alignment and, in some examples, create a higher crystalline content within the polymer thin film.

In some examples, a composition having a bimodal molecular weight distribution may be cast to form a thin film, which may be stretched to induce mechanical and piezoelectric anisotropy through crystal and/or chain realignment. Stretching may include the application of a uniaxial stress or a biaxial stress. In some embodiments, the application of an in-plane biaxial stress may be performed simultaneously or sequentially. In some embodiments, the low molecular weight additive may beneficially decrease the stretching temperature needed to achieve crystal and/or chain realignment. In some embodiments, a polymer thin film may be stretched by calendering, solid state extrusion, and/or a combination of thereof.

In accordance with various embodiments, an anisotropic PVDF-based polymer thin film may be formed by applying a desired stress state to a crystallizable polymer thin film. A polymer composition capable of crystallizing may be formed into a single layer using appropriate gel casting operations. For example, a vinylidene fluoride-containing composition may be cast and oriented as a single layer to form a mechanically and piezoelectrically anisotropic thin film. According to further embodiments, a crystallizable polymer may be cast to form a thin film and plural such thin films may be laminated to form a multilayer structure.

In some embodiments, a polymer thin film having a bimodal molecular weight distribution may be stretched to a larger stretch ratio than a comparative polymer thin film (i.e., lacking a low molecular weight additive). In some examples, a stretch ratio may be greater than 4, e.g., 5, 10, 20, 40, or more. The act of stretching may include a single stretching step or plural (i.e., successive) stretching steps where one or more of a stretching temperature and a strain rate may be independently controlled.

In example methods, the polymer thin film may be heated during stretching to a temperature of from approximately 60° C. to approximately 170° C. and stretched at a strain rate of from approximately 0.1%/sec to approximately 300%/sec. Moreover, one or both of the temperature and the strain rate may be held constant or varied during an act of stretching. For instance, a polymer thin film may be stretched at a first temperature and a first strain rate (e.g., 130° C. and 50%/sec) to achieve a first stretch ratio. Subsequently, the temperature of the polymer thin film may be increased, and the strain rate may be decreased to a second temperature and a second strain rate (e.g., 165° C. and 5%/sec) to achieve a second stretch ratio.

Such a stretched polymer thin film may exhibit higher crystallinity and a higher elastic modulus. By way of example, an oriented polymer thin film having a bimodal molecular weight distribution may have an in-plane elastic modulus greater than approximately 2 GPa, e.g., 3, 5, 10, 12, or 15 GPa, including ranges between any of the foregoing values, and a piezoelectric coefficient ($d_{31}$) greater than approximately 5 pC/N, e.g., 7 pC/N, 10 pC/N, 12 pC/N, 15 pC/N, 17 pC/N, 20 pC/N, 22 pC/N, 25 pC/N, 27 pC/N, or 30 pC/N, including ranges between any of the foregoing values. High piezoelectric performance may be associated with the creation and alignment of beta phase crystals in PVDF-family polymers.

Further to the foregoing, an electromechanical coupling factor $k_{ij}$ may indicate the effectiveness with which a piezoelectric material may convert electrical energy into mechanical energy, or vice versa. For a polymer thin film, the electromechanical coupling factor $k_{31}$ may be expressed as $$k_{31} = \frac{d31}{\sqrt{e33*s31}},$$

where $d_{31}$ is the piezoelectric strain coefficient, $e_{33}$ is the dielectric permittivity in the thickness direction, and $s_{31}$ is the compliance in the machine direction. Higher values of $k_{31}$ may be achieved by disentangling polymer chains prior to stretching and promoting dipole moment alignment within a crystalline phase. In some embodiments, a polymer thin film may be characterized by an electromechanical coupling factor $k_{31}$ of at least approximately 0.1, e.g., 0.1, 0.2, 0.3, or more, including ranges between any of the foregoing values.

According to some embodiments, the crystalline content of an anisotropic polymer thin film may include crystals of poly(vinylidene fluoride), poly(trifluoroethylene), poly(chlorotrifluoroethylene), poly(hexafluoropropene), and/or poly(vinyl fluoride), for example, although further crystalline polymer materials are contemplated, where a crystalline phase in a "crystalline" or "semi-crystalline" polymer thin film may, in some examples, constitute at least approximately 1% of the polymer thin film. For instance, the crystalline content (e.g., beta phase content) of a polymer thin film may be at least approximately 1%, e.g., 1, 2, 4, 10, 20, 40, 60, or 80%, including ranges between any of the foregoing values.

Stretching a PVDF-family film may form both alpha and beta phase crystals, although only aligned beta phase crystals contribute to piezoelectric response. During and/or after a stretching process, an electric field may be applied to the polymer thin film. The application of an electric field (i.e., poling) may induce the formation and alignment of beta phase crystals within the film. Whereas a lower electric field (<50 V/micron) may be applied to align beta phase crystals, a higher electric field (>50 V/micron) may be applied to both induce a phase transformation from the alpha phase to the beta phase and encourage alignment of the beta phase crystals.

In some embodiments, following stretching, the polymer thin film may be annealed. Annealing may be performed at a fixed or variable stretch ratio and/or a fixed or variable applied stress. An example annealing temperature may be greater than approximately 80° C., e.g., 100° C., 130° C., 150° C., 170° C., or 190° C., including ranges between any of the foregoing values. Without wishing to be bound by theory, annealing may stabilize the orientation of polymer chains and decrease the propensity for shrinkage of the polymer thin film.

Following deformation, the crystals or chains may be at least partially aligned with the direction of the applied tensile stress. As such, a polymer thin film may exhibit a high degree of birefringence, a high degree of optical clarity, bulk haze of less than approximately 10%, a high piezoelectric coefficient, e.g., $d_{31}$ greater than approximately 5 pC/N and/or a high electromechanical coupling factor, e.g., $k_{31}$ greater than approximately 0.1.

In example experiments, PVDF resin was dissolved completely in various liquid solvents, including DMF, cyclohexanone (CH), and mixtures of DMF and cyclohexanone. In one example, a 10 wt. % solution of PVDF in DMF was prepared under constant stirring at 60° C. (Sample 1). In a further example, a 10 wt. % solution of PVDF in cyclohexanone was prepared under constant stirring at 90° C. (Sample 4). A 50-50 w/w solvent mixture of DMF and cyclohexanone was used to prepare further 10 wt. % resin solutions under constant stirring at 80° C. (Samples 2 and 3).

The respective Samples 1-4 were maintained at the target temperature under constant stirring for 3 hr until the solution was clear. The solutions were then poured into separate vessels and allowed to form a gel over a period of approximately 1 hr. Following gelation, the gels were washed with methanol (5×) to remove residual solvent. The washed gels were stored in a fume hood overnight to evaporate the methanol and obtain a dry, white gel.

Successive calendering steps at room temperature were used to process the dried gels, where the roller gap was decreased with each successive pass through the calendering apparatus. Transparent thin films were obtained with stretch ratios ranging from approximately 2 to approximately 5.

The calendered polymerthin films were heated, stretched, and then measured for crystalline content. The act of stretching included locally heating the thin film samples to 140° C., initiating an applied stress, and increasing the temperature at a rate of 5° C./min to a target stretch temperature of approximately 160° C. until reaching an applied stress of 250 MPa, whereupon the thin film temperature was increased further at a rate of 1° C./min to 170° C. while maintaining the 250 MPa stress. The stretch ratio was between 10 and 12. Unannealed thin films were then cooled to less than 40° C. prior to removing the applied stress.

In some embodiments, a stretched thin film may be annealed. For example, after reaching a temperature of 170° C., the temperature may be increased further at a rate of 0.5° C./min to an annealing temperature of 195° C. under a constant applied stress of 250 MPa. The samples may be maintained at 195° C. for 40 min. The annealing process may increase the stretch ratio to values greater than 12, e.g., from 12 to 15. An annealed sample may be cooled to less than 40° C. prior to removing the applied stress.

After cooling, total crystallinity was measured using differential scanning calorimetry (DSC), and the relative beta phase ratio was determined using Fourier Transform Infrared Spectroscopy (FTIR). The absolute beta crystallinity was calculated as the product of the total crystallinity and the relative beta ratio. The modulus (i.e., storage modulus) was measured by dynamic mechanical analysis (DMA). The data in Table 1 indicate that a gel cast using a poor solvent (Sample 4) can achieve a higher modulus after stretching than a gel cast using a good solvent (Sample 1). In addition, annealing may increase both the total crystalline content and the modulus of a stretched thin film (Sample 2 and Sample 3).

TABLE 1

Effect of Solvent and Annealing on PVDF Thin Film Properties

| Sample | Solvent | Annealing? | Relative Beta % | Total Crystallinity % | Absolute Beta Crystallinity % | Modulus (GPa) |
|---|---|---|---|---|---|---|
| 1 | DMF | N | 97 | 61 | 59 | 5.1 |
| 2 | DMF:CH | N | 90 | 66 | 59 | 6.5 |
| 3 | DMF:CH | Y | 80 | 81 | 65 | 7.5 |
| 4 | CH | N | 96 | 69 | 66 | 10.3 |

In some examples, the applied stress during stretching may range from approximately 100 MPa to approximately 500 MPa, e.g., 100, 150, 200, 250, 300, 350, 400, 450, or 500 MPa, including ranges between any of the foregoing values. In a further example experiment where cyclohexane was used as a solvent, the thin film was stretched at a maximum applied stress of approximately 400 MPa.

In accordance with various embodiments, anisotropic polymer thin films may include fibrous, amorphous, partially crystalline, or wholly crystalline materials. Such materials may also be mechanically anisotropic, where one or more characteristics may include compressive strength, tensile strength, shear strength, yield strength, stiffness, hardness, toughness, ductility, machinability, thermal expansion, piezoelectric response, and creep behavior may be directionally dependent.

A polymer composition having a bimodal molecular weight may be formed into a single layer using casting operations. Alternatively, a polymer composition having a bimodal molecular weight may be cast with other polymers or other non-polymer materials to form a multilayer polymer thin film. The application of a uniaxial or biaxial stress to a gel cast single or multilayer thin film may be used to align polymer chains and/or re-orient crystals to induce mechanical and piezoelectric anisotropy therein.

A piezoelectric polymer thin film may be formed from a composition that includes a crystallizable polymer and a low molecular weight additive. In particular embodiments, a piezoelectric polymer thin film having a high electromechanical efficiency may be formed by a gel casting method. An example method may include forming a solution of a crystallizable polymer and a solvent, forming a gel from the solution by either decreasing the temperature of the solution, removing the solvent, adding a poor solvent, or a combination of thereof, and then calendering, orienting, and poling the thin film. The choice of solvent may facilitate chain disentanglement and accordingly polymer chain and dipole alignment, e.g., during orienting. The thin film may be characterized by an electromechanical coupling factor, $k_{31}$, of at least 0.1.

The crystallizable polymer and the low molecular weight additive may be independently selected to include vinylidene fluoride (VDF), trifluoroethylene (TrFE), chloride trifluoride ethylene (CTFE), hexafluoropropene (HFP), vinyl fluoride (VF), as well as homopolymers, co-polymers, tri-polymers, derivatives, and combinations thereof. The high molecular weight component of the polymer thin film may have a molecular weight of at least 100,000 g/mol, whereas the low molecular weight additive may have a molecular weight of less than 200,000 g/mol and may constitute 0.1 wt. % to 90 wt. % of the polymer thin film.

The application of a uniaxial or biaxial stress to a single or multilayer thin film may be used to align polymer chains and/or orient crystals to induce optical and mechanical anisotropy. Such thin films may be used to fabricate anisotropic piezoelectric substrates, birefringent substrates, high Poisson's ratio thin films, reflective polarizers, birefringent mirrors, and the like, and may be incorporated into AR/VR combiners or used to provide display brightness enhancement.

Aspects of the present disclosure thus relate to the formation of a single layer of a piezoelectrically anisotropic polymer thin film as well as a multilayer polymer thin film having improved mechanical and piezoelectric properties and including one or more piezoelectrically anisotropic polymer thin films. The improved mechanical properties may include improved dimensional stability and improved compliance in conforming to a surface having compound curvature, such as a lens.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-11, a detailed description of compositions and methods for forming anisotropic polymer thin films. The discussion associated with FIG. 1 relates to an example gel casting method for forming a polymer thin film having high electromechanical efficiency. The discussion associated with FIGS. 2-4 includes a description of polymer compositions having a bimodal molecular weight distribution. The discussion associated with FIGS. 5-9 relates to example polymer thin film stretching paradigms and associated stretching apparatus. The discussion associated with FIGS. 10 and 11 relates to exemplary virtual reality and augmented reality devices that may include one or more anisotropic polymer materials as disclosed herein.

Referring to FIG. 1, shown is a flow chart depicting a gel casting method for forming a polymer thin film having a high electromechanical efficiency. An example method 100 may include forming a PVDF solution 101 by combining a crystallizable polymer and a solvent, forming a gel 102 from the PVDF solution by removing at least some of the solvent, decreasing the solution temperature, and/or adding a poor solvent, optionally washing the solvent 103, calendering the processed PVDF gel 104, stretching the gel 105 to form an oriented polymer thin film, optionally removing any remaining solvent 106 from the polymer thin film, and poling 107 the polymer thin film to form a PVDF polymer thin film having a high electromechanical efficiency 108. Solvent removal may include cooling the gel, adding to the gel a relatively poor solvent, or a combination thereof. Solvent removal may include a solvent washing step where the solvent is partially or wholly replaced with a secondary solvent that is then partially or completely removed. The acts of stretching, solvent removal, and poling may be performed in succession and/or in any concurrent processing paradigm.

Figure 2:
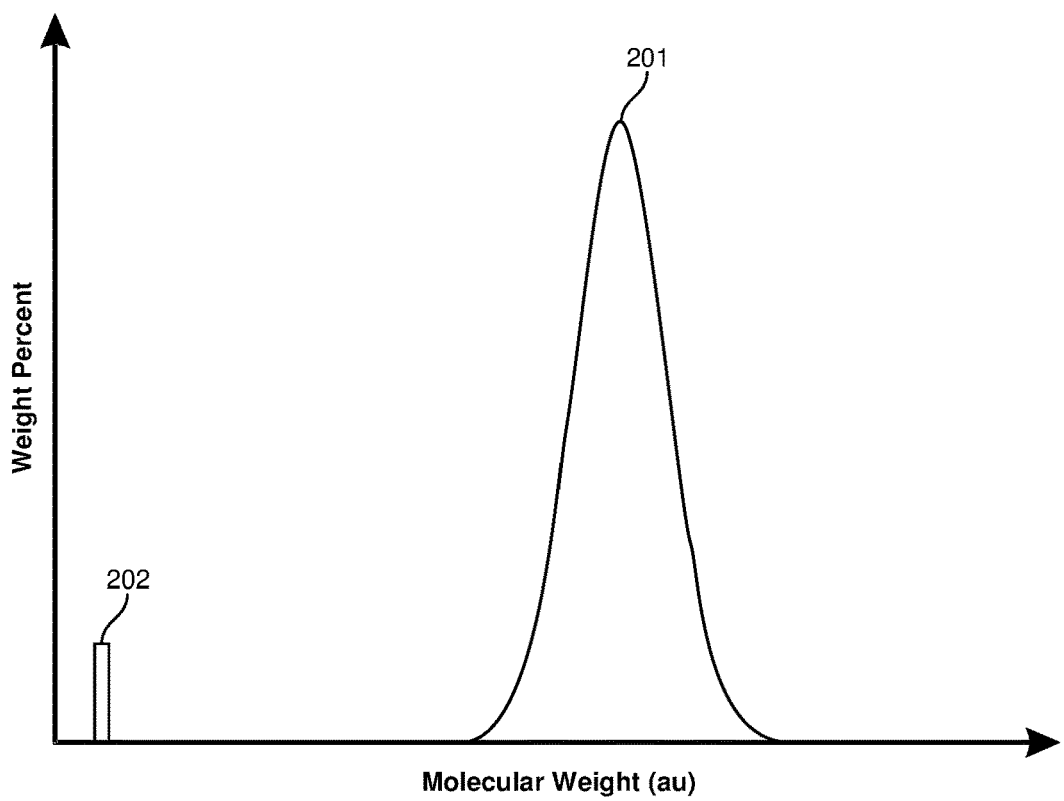
FIG. 2 is a plot showing the bimodal distribution of molecular weights among components of an example polymer gel according to some embodiments.
Figure 3:
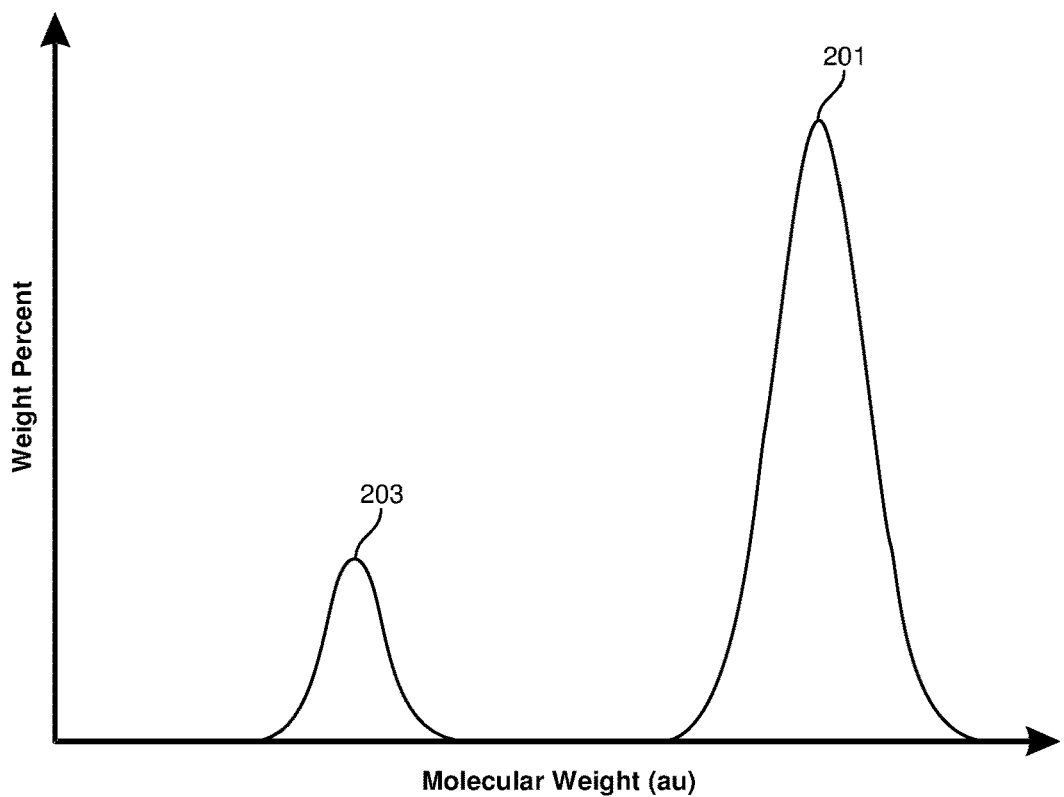
FIG. 3 is a plot showing the bimodal distribution of molecular weights among components of an example polymer gel according to further embodiments.
Figure 4:
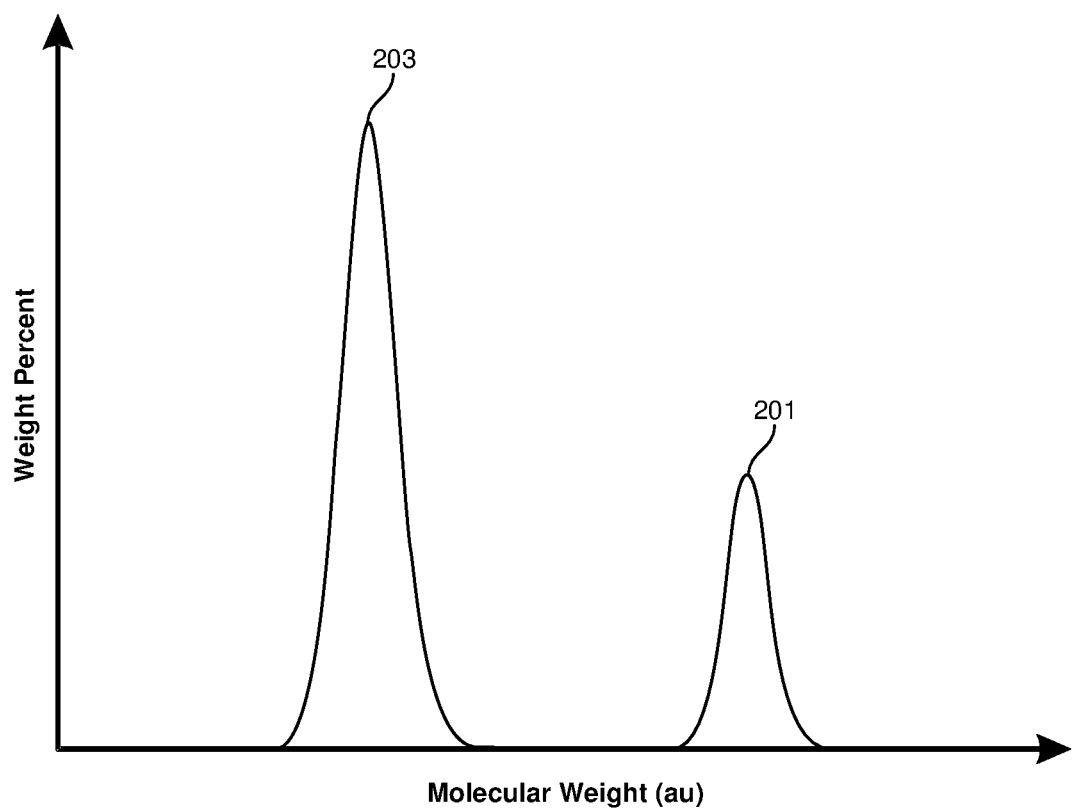
FIG. 4 is a plot showing the bimodal distribution of molecular weights among components of an example polymer gel according to still further embodiments.

Referring to FIG. 2, shown schematically is a composition having a bimodal molecular weight distribution that includes a crystallizable polymer 201 and a low molecular weight additive 202. Referring to FIG. 3, shown schematically is a further composition having a bimodal molecular weight distribution that includes a crystallizable polymer 201 and a low molecular weight additive 203, where the content of the crystallizable polymer is greater than the content of the low molecular weight additive. Referring to FIG. 4, shown schematically is a still further composition having a bimodal molecular weight distribution that includes a crystallizable polymer 201 and a low molecular weight additive 203, where the content of the crystallizable polymer is less than the content of the low molecular weight additive.

Figure 5:
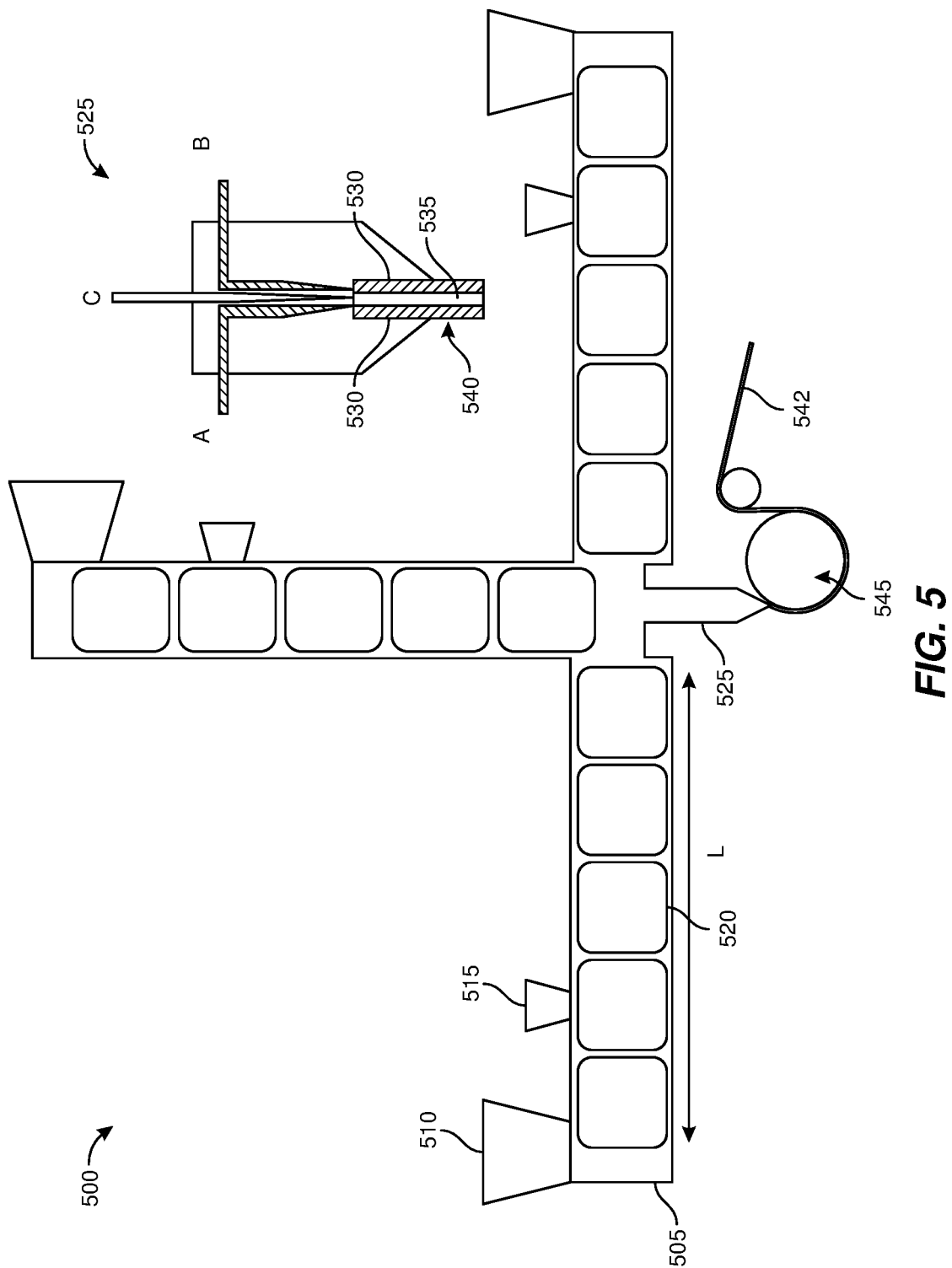
FIG. 5 is a schematic illustration of an extrusion system for forming a polymer thin film according to certain embodiments.

Referring now to FIG. 5, shown schematically is an example extrusion system for forming a cast polymer thin film. An extrusion system 500 may be configured to form a single layer polymer thin film or, as shown in the illustrated embodiment, a multilayer polymer thin film from plural sources. Different sources of feedstock may differ compositionally, for example. Multilayer polymer thin films may include 2 or more layers, where individual layers may be formed simultaneously in situ or aggregated to form a multilayer having, for example, 4, 8, 16, 32, 64, 128, 256, 512, or a greater number of individual layers.

During operation, a resin typically provided in powder or pellet form may be fed into extruder 505 from a hopper 510. One or more optional additives may be blended with the resin within hopper 510 or incorporated using a separate downstream hopper 515. The temperature of extruder 505 along its length (L) may be controlled by heating elements 520. Extruder 505 may include a screw or other element (not shown) for mixing, homogenizing, and driving feedstock from hoppers 510, 515 to an extrusion die 525.

As shown in the inset, extrusion die 525 may include plural inputs A, B, C, that are configured to receive feedstock from plural respective extruders (e.g., extruder 505, etc.). In some embodiments, the temperature of the die 525 may be greater than the melting point of the feedstock. The melted feedstock may be output through die 525 to form a multilayer thin film 540 that may include, for example, a central polymer layer 535 and a pair of outer layers 530 that sandwich the central layer 535. Multilayer thin film 540 may be initially collected on a chilled roller 545 and output as a pre-oriented cast thin film 542. The temperature of the chilled roller 545 may be selected based on the type of additive(s) used in the process. The rotational rate of the chilled roller 545 (i.e., relative to the output rate of the extrusion die 525) may be adjusted to pre-orient multilayer thin film 540.

In some embodiments, the central layer 535 may include PVDF. Each outer layer 530 may include a material having a high surface energy relative to polyethylene or a material having a low surface energy relative to PVDF.

Prior to an act of stretching, one or both of the outer layers 530 may be removed from the multilayer thin film 540. By way of example, the outer layer(s) 530 may be removed prior to stretching the central layer 535, removed after one stage of the stretching (e.g., removed after stretching along the machine direction), or removed following two stages of stretching (e.g., removed following an OCS process). In some embodiments, the outer layers 530 may be removed from the central layer 535 by peeling. In some embodiments, the outer layers 530 may have a 90° peel strength of at least approximately 10 g/cm width, e.g., 10, 20, 50, 100, 500, or 1000 g/cm width, including ranges between any of the foregoing values.

Figure 6:
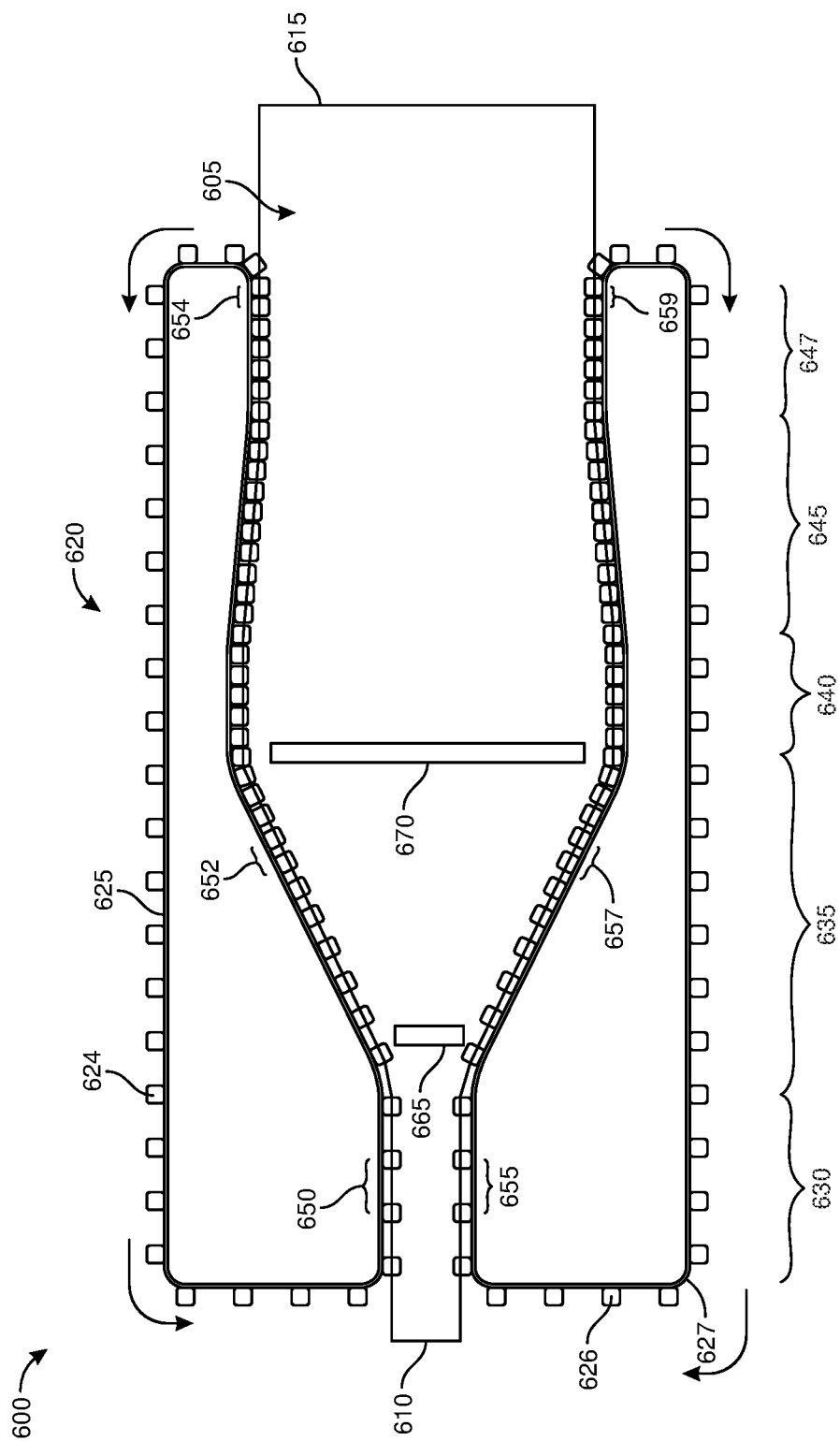
FIG. 6 is a schematic view of an example thin film orientation system for manufacturing an anisotropic polymer thin film according to some embodiments.

A single stage thin film orientation system for forming an optically anisotropic polymer thin film is shown schematically in FIG. 6. System 600 may include a thin film input zone 630 for receiving and pre-heating a crystallizable portion 610 of a polymer thin film 605, a thin film output zone 647 for outputting a crystallized and oriented portion 615 of the polymer thin film 605, and a clip array 620 extending between the input zone 630 and the output zone 647 that is configured to grip and guide the polymer thin film 605 through the system 600, i.e., from the input zone 630 to the output zone 647. Clip array 620 may include a plurality of movable first clips 624 that are slidably disposed on a first track 625 and a plurality of movable second clips 626 that are slidably disposed on a second track 627.

Polymer thin film 605 may include a single polymer layer or multiple (e.g., alternating) layers of first and second polymers, such as a multilayer ABAB . . . structure. Alternately, polymer thin film 605 may include a composite architecture having a crystallizable polymer thin film and a high Poisson's ratio polymer thin film directly overlying the crystallizable polymer thin film (not separately shown). In some embodiments, a polymer thin film composite may include a high Poisson's ratio polymer thin film reversibly laminated to, or printed on, a single crystallizable polymer thin film or a multilayer polymer thin film.

During operation, proximate to input zone 630, clips 624, 626 may be affixed to respective edge portions of polymer thin film 605, where adjacent clips located on a given track 625, 627 may be disposed at an inter-clip spacing 650, 655. For simplicity, in the illustrated view, the inter-clip spacing 650 along the first track 625 within input zone 630 may be equivalent or substantially equivalent to the inter-clip spacing 655 along the second track 627 within input zone 630. As will be appreciated, in alternate embodiments, within input zone 630, the inter-clip spacing 650 along the first track 625 may be different than the inter-clip spacing 655 along the second track 627.

In addition to input zone 630 and output zone 647, system 600 may include one or more additional zones 635, 640, 645, etc., where each of: (i) the translation rate of the polymer thin film 605, (ii) the shape of first and second tracks 625, 627, (iii) the spacing between first and second tracks 625, 627, (iv) the inter-clip spacing 650, 652, 654, 655, 657, 659, and (v) the local temperature of the polymer thin film 605, etc. may be independently controlled.

In an example process, as it is guided through system 600 by clips 624, 626, polymer thin film 605 may be heated to a selected temperature within each of zones 630, 635, 640, 645, 647. Fewer or a greater number of thermally controlled zones may be used. As illustrated, within zone 635, first and second tracks 625, 627 may diverge along a transverse direction such that polymerthin film 605 may be stretched in the transverse direction while being heated, for example, to a temperature greater than its glass transition temperature (Tg) but less than the onset of melting.

Referring still to FIG. 6, within zone 635 the spacing 652 between adjacent first clips 624 on first track 625 and the spacing 657 between adjacent second clips 626 on second track 627 may decrease relative to the inter-clip spacing 650, 655 within input zone 630. In certain embodiments, the decrease in clip spacing 652, 657 from the initial spacing 650, 655 may scale approximately as the square root of the transverse stretch ratio. The actual ratio may depend on the Poisson's ratio of the polymer thin film as well as the requirements for the stretched thin film, including flatness, thickness, etc. Accordingly, in some embodiments, the in-plane axis of the polymer thin films that is perpendicular to the stretch direction may relax by an amount equal to the square root of the stretch ratio in the stretch direction. By decreasing the clip spacings 652, 657 relative to inter-clip spacing 650, 655 the polymer thin film may be allowed to relax along the machine direction while being stretched along the transverse direction.

A temperature of the polymer thin film may be controlled within each heating zone. Withing stretching zone 635, for example, a temperature of the polymer thin film 605 may be constant or independently controlled within sub-zones 665, 670, for example. In some embodiments, the temperature of the polymer thin film 605 may be decreased as the stretched polymer thin film 605 enters zone 640. Rapidly decreasing the temperature (i.e., thermal quenching) following the act of stretching within zone 635 may enhance the conformability of the polymer thin film 605. In some embodiments, the polymer thin film 605 may be thermally stabilized, where the temperature of the polymer thin film 605 may be controlled within each of the post-stretch zones 640, 645, 647. A temperature of the polymer thin film may be controlled by forced thermal convection or by radiation, for example, IR radiation, or a combination thereof.

Downstream of stretching zone 635, according to some embodiments, a transverse distance between first track 625 and second track 627 may remain constant or, as illustrated, initially decrease (e.g., within zone 640 and zone 645) prior to assuming a constant separation distance (e.g., within output zone 647). In a related vein, the inter-clip spacing downstream of stretching zone 635 may increase or decrease relative to inter-clip spacing 652 along first track 625 and inter-clip spacing 657 along second track 627. For example, inter-clip spacing 655 along first track 625 within output zone 647 may be less than inter-clip spacing 652 within stretching zone 635, and inter-clip spacing 659 along second track 627 within output zone 647 may be less than inter-clip spacing 657 within stretching zone 635. According to some embodiments, the spacing between the clips may be controlled by modifying the local velocity of the clips on a linear stepper motor line, or by using an attachment and variable clip spacing mechanism connecting the clips to the corresponding track.

To facilitate cross-stretch relaxation while stretching in the TD direction, the inter-clip spacings 652, 657 withing stretching zone 635 may be decreased by at least approximately 20% (e.g., 20%, 30%, 40%, or 50% or more) relative to respective inter-clip spacings 650, 655 within input zone 630. The relaxation profile may be constant or variable, i.e., as a function of position, across stretching zone 635. According to some embodiments, a maximum TD draw ratio within stretching zone 635 be at least approximately 2 and less than approximately 4. The stretched and oriented polymer thin film 615 may be removed from system 600 and stretched in a further stretching step, such as via length orientation with relaxation as shown in FIG. 4.

Figure 7:
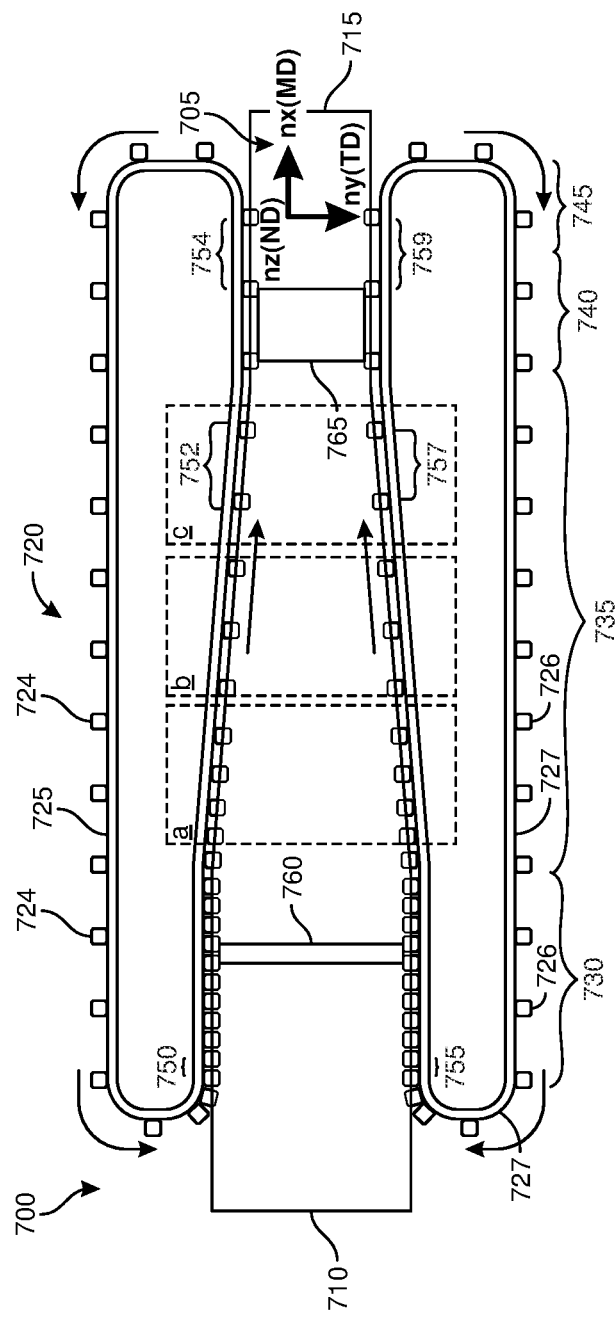
FIG. 7 is a schematic view of a thin film orientation system for manufacturing an anisotropic polymer thin film according to further embodiments.

Referring to FIG. 7, shown is a further example system for forming an anisotropic polymer thin film. Thin film orientation system 700 may include a thin film input zone 730 for receiving and pre-heating a crystalline or crystallizable portion 710 of a polymer thin film 705, a thin film output zone 745 for outputting an at least partially crystallized and oriented portion 715 of the polymer thin film 705, and a clip array 720 extending between the input zone 730 and the output zone 745 that is configured to grip and guide the polymer thin film 705 through the system 700. As in the previous embodiment, clip array 720 may include a plurality of first clips 724 that are slidably disposed on a first track 725 and a plurality of second clips 726 that are slidably disposed on a second track 727. In certain embodiments, crystalline or crystallizable portion 710 may correspond to stretched and oriented polymer thin film 615.

In an example process, proximate to input zone 730, first and second clips 724, 726 may be affixed to edge portions of polymer thin film 705, where adjacent clips located on a given track 725, 727 may be disposed at an initial inter-clip spacing 750, 755, which may be substantially constant or variable along both tracks within input zone 730. Within input zone 730 a distance along the transverse direction between first track 725 and second track 727 may be constant or substantially constant.

System 700 may additionally include one or more zones 735, 740, etc. The dynamics of system 700 allow independent control over: (i) the translation rate of the polymer thin film 705, (ii) the shape of first and second tracks 725, 727, (iii) the spacing between first and second tracks 725, 727 along the transverse direction, (iv) the inter-clip spacing 750, 755 within input zone 730 as well as downstream of the input zone (e.g., inter-clip spacings 752, 754, 757, 759), and (v) the local temperature of the polymer thin film, etc.

In an example process, as it is guided through system 700 by clips 724, 726, polymer thin film 705 may be heated to a selected temperature within each of zones 730, 735, 740, 745. A temperature greater than the glass transition temperature of a component of the polymer thin film 705 may be used during deformation (i.e., within zone 735), whereas a lesser temperature, an equivalent temperature, or a greater temperature may be used within each of one or more downstream zones.

As in the previous embodiment, the temperature of the polymer thin film 705 within stretching zone 735 may be locally controlled. According to some embodiments, the temperature of the polymer thin film 705 may be maintained at a constant or substantially constant value during the act of stretching. According to further embodiments, the temperature of the polymer thin film 705 may be incrementally increased within stretching zone 735. That is, the temperature of the polymer thin film 705 may be increased within stretching zone 735 as it advances along the machine direction. By way of example, the temperature of the polymer thin film 705 within stretching zone 735 may be locally controlled within each of heating zones a, b, and c.

The temperature profile may be continuous, discontinuous, or combinations thereof. As illustrated in FIG. 7, heating zones a, b, and c may extend across the width of the polymer thin film 705, and the temperature within each zone may be independently controlled according to the relationship $T_g < T_a < T_b < T_c < T_m$. A temperature difference between neighboring heating zones may be less than approximately 20° C., e.g., less than approximately 10° C., or less than approximately 5° C.

Referring still to FIG. 7, within zone 735 the spacing 752 between adjacent first clips 724 on first track 725 and the spacing 757 between adjacent second clips 726 on second track 727 may increase relative to respective inter-clip spacings 750, 755 within input zone 730, which may apply an in-plane tensile stress to the polymer thin film 705 and stretch the polymer thin film along the machine direction. Moreover, the extent of inter-clip spacing on one or both tracks 725, 727 within deformation zone 735 may be constant or variable and, for example, increase as a function of position along the machine direction.

Within stretching zone 735, the inner-clip spacings 752, 757 may increase linearly such that the primary mode of deformation may be at constant velocity. For example, a strain rate of the polymer thin film may decrease along the machine direction. In further embodiments, the polymer thin film 705 may be stretched at a constant strain-rate where the inter-clip spacing may increase exponentially.

In certain examples, a progressively decreasing strain rate may be implemented with thin film orientation system 700 to generate a high refractive index polymer thin film. For instance, within stretching zone 735 an inter-clip spacing may be configured such that a distance between each successive pair of clips 724, 726 increases along the machine direction. The inter-clip spacing between each successive pair of clips may be independently controlled to achieve a desired strain rate along the machine direction.

In response to the tensile stress applied along the machine direction, system 700 is configured to inhibit the generation of stresses and an attendant realignment of crystals along the machine direction. As illustrated, within zone 735, first and second tracks 725, 727 may converge along a transverse direction such that polymer thin film 705 may relax in the transverse direction while being stretched in the machine direction. Using a single stretching step or multiple stretching steps, polymer thin film 705 may be stretched by a factor of at least approximately 4 (e.g., 4, 5, 6, 7, 8, 9, 10, 20, 40, 100, or more, including ranges between any of the foregoing values).

Within stretching zone 735, an angle of inclination of first and second tracks 725, 727 (i.e., with respect to the machine direction) may be constant or variable. In particular examples, the inclination angle within stretching zone 735 may decrease along the machine direction. That is, according to certain embodiments, the inclination angle within heating zone a may be greater than the inclination angle within heating zone b, and the inclination angle within heating zone b may be greater than the inclination angle within heating zone c. Such a configuration may be used to provide a progressive decrease in the relaxation rate (along the transverse direction) within the stretching zone 735 as the polymer thin film advances through system 700.

In some embodiments, the temperature of the polymer thin film 705 may be decreased as the stretched polymer thin film 705 exits zone 735. In some embodiments, the polymer thin film 705 may be thermally stabilized, where the temperature of the polymer thin film 705 may be controlled within each of the post-deformation zones 740, 745. A temperature of the polymer thin film may be controlled by forced thermal convection or by radiation, for example, IR radiation, or a combination thereof.

Downstream of deformation zone 735, the inter-clip spacing may increase or remain substantially constant relative to inter-clip spacing 752 along first track 725 and inter-clip spacing 757 along second track 727. For example, inter-clip spacing 755 along first track 725 within output zone 745 may be substantially equal to the inter-clip spacing 752 as the clips exit zone 735, and inter-clip spacing 759 along second track 727 within output zone 745 may be substantially equal to the inter-clip spacing 757 as the clips exit zone 735. Following the act of stretching, polymer thin film 705 may be annealed, for example, within one or more downstream zones 740, 745.

The strain impact of the thin film orientation system 700 is shown schematically by unit segments 760, 765, which respectively illustrate pre- and post-deformation dimensions for a selected area of polymer thin film 705. In the illustrated embodiment, polymer thin film 705 has a pre-stretch width (e.g., along the transverse direction) and a pre-stretch length (e.g., along the machine direction). As will be appreciated, a post-stretch width may be less than the pre-stretch width and a post-stretch length may be greater than the pre-stretch length.

In some embodiments, a roll-to-roll system may be integrated with a thin film orientation system, such as thin film orientation system 600 or thin film orientation system 700, to manipulate a polymer thin film. In further embodiments, as illustrated herein with reference FIG. 8, a roll-to-roll system may itself be configured as a thin film orientation system.

Figure 8:
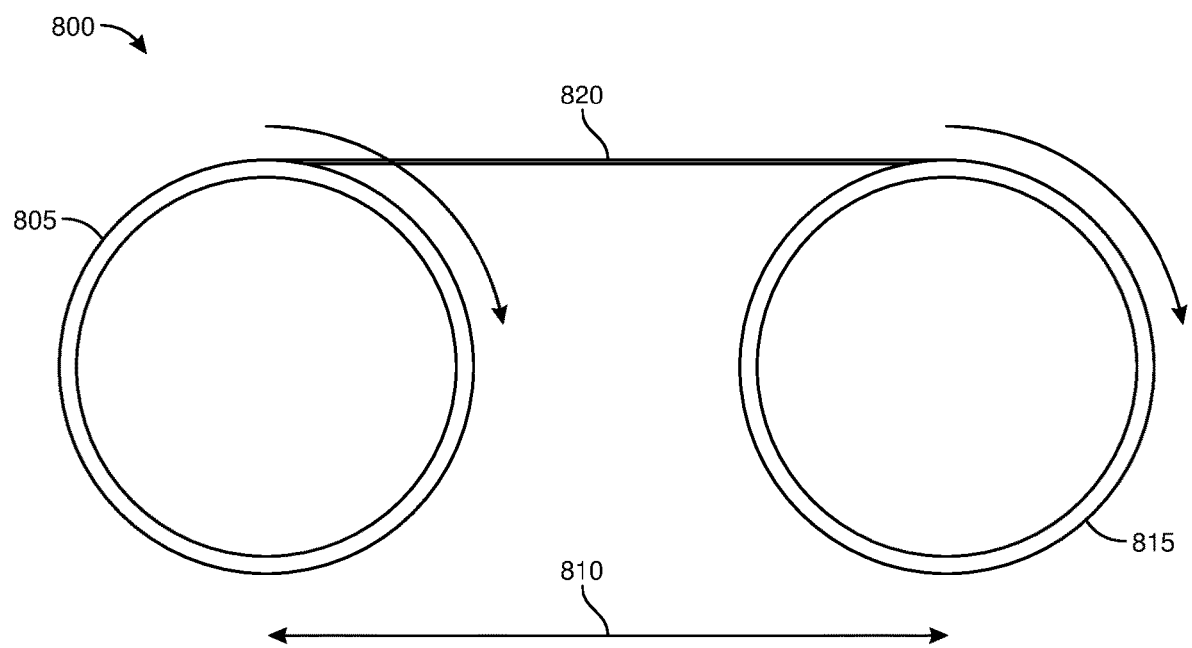
FIG. 8 illustrates a roll-to-roll manufacturing configuration for conveying and orienting a polymer thin film according to certain embodiments.

An example roll-to-roll polymer thin film orientation system is depicted in FIG. 8. In conjunction with system 800, a method for stretching a polymer thin film 820 may include mounting the polymer thin film between linear rollers 805, 815 and heating a portion of the polymer thin film located between the rollers 805, 815 to a temperature greater than its glass transition temperature. Rollers 805, 815 may be arranged with a controllable spacing 810 therebetween. A heat source (not shown), such as an IR source optionally equipped with an IR reflector, may be used to heat the polymer thin film 820 within a deformation region between the rollers.

While controlling the temperature of the polymer thin film, rollers 805, 815 may be engaged and the polymer thin film may be stretched. For instance, first roller 805 may rotate at a first rate and second roller 815 may rotate at a second rate greater than the first rate to stretch the polymer thin film along a machine direction therebetween. Within a deformation zone between rollers, system 800 may be configured to locally control the temperature and the strain rate of the polymer thin film. In some examples, as the polymer thin film advances from roller 805 to roller 815, a temperature of the polymer thin film may increase, and a strain rate of the polymer thin film may decrease. Downstream of roller 815, the polymer thin film may then be cooled while maintaining the applied stress. System 800 may be used to form a uniaxially oriented polymer thin film. Additional rollers may be added to system 800 to control the conveyance and take-up of the polymer thin film.

Figure 9:
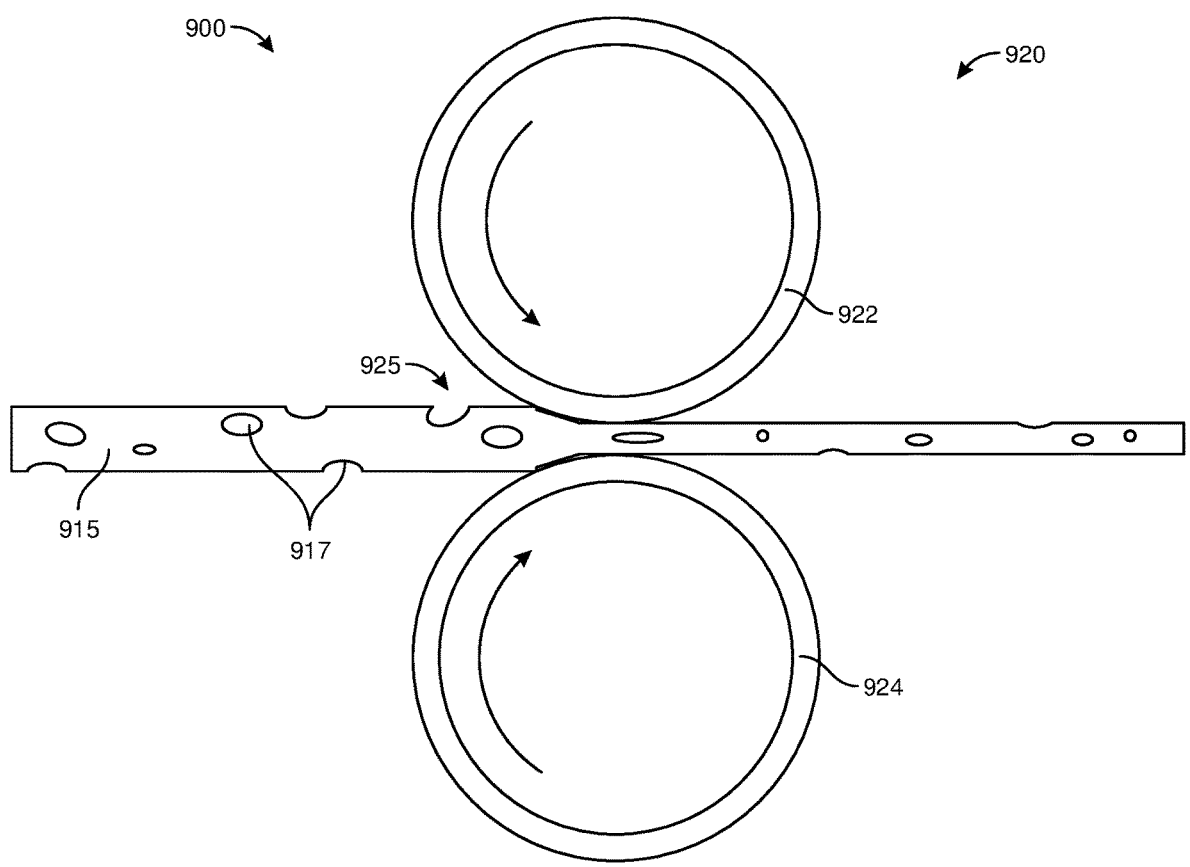
FIG. 9 illustrates an embodiment of a calendering method for manufacturing a polymer thin film according to certain embodiments.

Referring to FIG. 9, shown schematically is a calendering method for manufacturing an anisotropic polymer thin film. In method 900, a stretched PVDF thin film 915, such as oriented polymer thin film 615 or oriented polymer thin film 715, may be fed into a calendering system 920. Calendering system 920 may include a pair of counter-rotating rollers 922, 924 defining a nip region 925. As the thin film 915 passes into the nip region 925 and between the rollers 922, 924, the thin film 915 may be compressed. In exemplary embodiments, rollers 922, 924 may be heated. In some examples, the temperature of the rollers during calendering may be greater than the glass transition temperature of the polymer. In some examples, the temperature of the rollers during calendering may be less than, equal to, or greater than the melting onset temperature of the polymer.

During calendering, voids 917 present in stretched PVDF thin film 915 may be compressed, and the overall void fraction within the thin film may be decreased. Moreover, voids exposed at a surface of the thin film may be smoothed, resulting in decreased surface roughness and, together with compression of voids within the bulk of the thin film, higher transmissivity and higher thermal conductivity.

According to some embodiments, a polymer thin film may include a crystalline polymer and a low (i.e., lower) molecular weight additive. The piezoelectric performance of PVDF and other PVDF-family polymer thin films, for instance, may be determined by the amount of oriented beta phase crystals in the film. Beta phase crystals may be formed during the acts of film forming, stretching, and/or electric poling.

Whereas the total crystallinity and the degree of crystalline alignment may be limited by conventional processing, e.g., due to chain entanglement, Applicants have shown that a gel casting method, optionally in conjunction with the addition of a low molecular weight additive to a thin film composition, may decrease chain entanglement of the high molecular weight component, which may increase the overall extent of beta phase crystallization as well as increase the alignment of beta phase crystals within the polymer thin film, e.g., during forming, stretching and/or poling operations.

EXAMPLE EMBODIMENTS

Example 1: A polymer thin film includes a crystalline PVDF-family polymer having a molecular weight of at least approximately 100,000 g/mol, where the polymer thin film has an electromechanical coupling factor ($k_{31}$) of at least approximately 0.1.

Example 2: The polymer thin film of Example 1, where the crystalline PVDF-family polymer is preferentially oriented along a predetermined axis.

Example 3: The polymer thin film of any of Examples 1 and 2, where the crystalline PVDF-family polymer includes a moiety selected from vinylidene fluoride, trifluoroethylene, chlorotrifluoroethylene, hexafluoropropene, vinyl fluoride, homopolymers thereof, co-polymers thereof, tri-polymers thereof, and derivatives thereof.

Example 4: The polymer thin film of any of Examples 1-3, further including an additive having a molecular weight less than the molecular weight of the crystalline PVDF-family polymer.

Example 5: The polymer thin film of Example 4, where the additive includes a moiety selected from vinylidene fluoride, trifluoroethylene, chlorotrifluoroethylene, hexafluoropropene, vinyl fluoride, homopolymers thereof, co-polymers thereof, tri-polymers thereof, and derivatives thereof.

Example 6: The polymer thin film of any of Examples 4 and 5, where the additive includes one or more of a nucleation agent, a piezoelectric ceramic, and a cation.

Example 7: The polymer thin film of any of Examples 4-6, where the additive contains a non-reactive moiety selected from an ester, ether, hydroxyl, phosphate, fluorine, halogen, and nitrile.

Example 8: The polymer thin film of any of Examples 4-7, where the additive constitutes from approximately 0.1 to approximately 90 wt. % of the polymer thin film.

Example 9: The polymer thin film of any of Examples 4-8, where the additive includes a thiol or an acid.

Example 10: The polymer thin film of any of Examples 4-9, where the additive has a molecular weight of less than approximately 25,000 g/mol.

Example 11: The polymer thin film of any of Examples 4-9, where the additive has a molecular weight of from approximately 25,000 g/mol to approximately 100,000 g/mol.

Example 12: A method includes forming a polymer solution including a crystallizable PVDF-family polymer and a liquid solvent, forming a gel from the polymer solution, forming a polymer thin film from the gel by calendering or solid state extrusion, stretching the polymer thin film, and applying an electric field to the polymer thin film to form a poled polymer thin film, where an electromechanical coupling factor (k31) of the poled polymer thin film is at least approximately 0.1.

Example 13: The method of Example 12, where forming the gel includes removing at least a portion of the liquid solvent from the polymer solution.

Example 14: The method of any of Examples 12 and 13, where forming the gel includes cooling the polymer solution.

Example 15: The method of any of Examples 12-14, where forming the gel includes adding a poor solvent to the polymer solution.

Example 16: The method of any of Examples 12-15, where stretching the polymer thin film includes applying a uniaxial stress.

Example 17: The method of any of Examples 12-16, where stretching the polymer thin film includes applying a biaxial stress.

Example 18: The method of any of Examples 12-17, where stretching the polymer thin film includes applying a first tensile stress along a first in-plane direction of the polymer thin film and applying a second tensile stress along a second in-plane direction of the polymer thin film.

Example 19: The method of any of Examples 12-18, further including annealing the polymer thin film.

Example 20: A polymer thin film including a crystalline PVDF-family polymer having a bi-modal molecular weight distribution, where the polymer thin film includes at least one of (i) an in-plane elastic modulus of at least approximately 5 GPa, and (ii) a piezoelectric coefficient ($d_{31}$) greater than approximately 20 pC/N.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
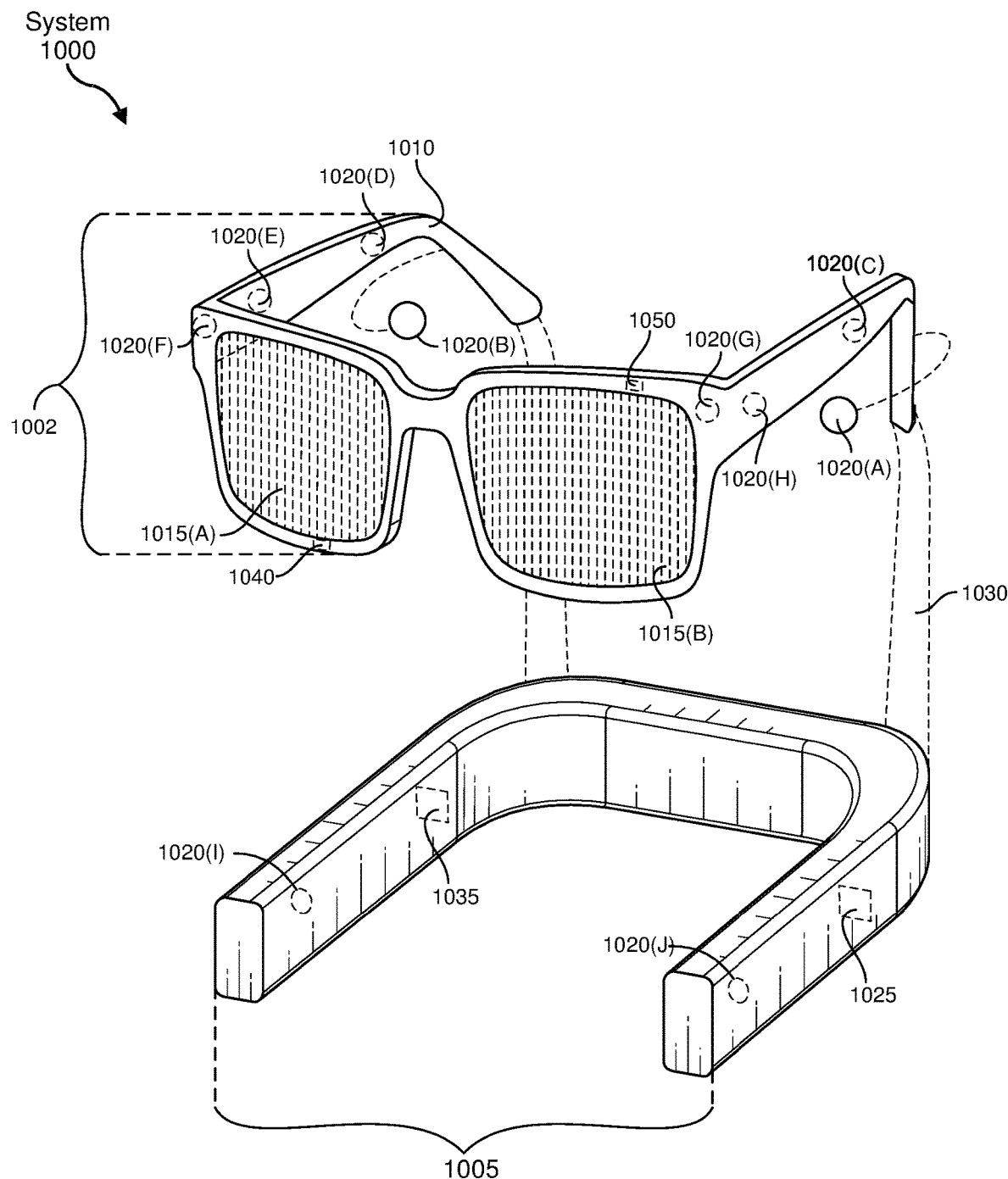
FIG. 10 is an illustration of exemplary augmented-reality glasses that may be used in connection with embodiments of this disclosure.
Figure 11:
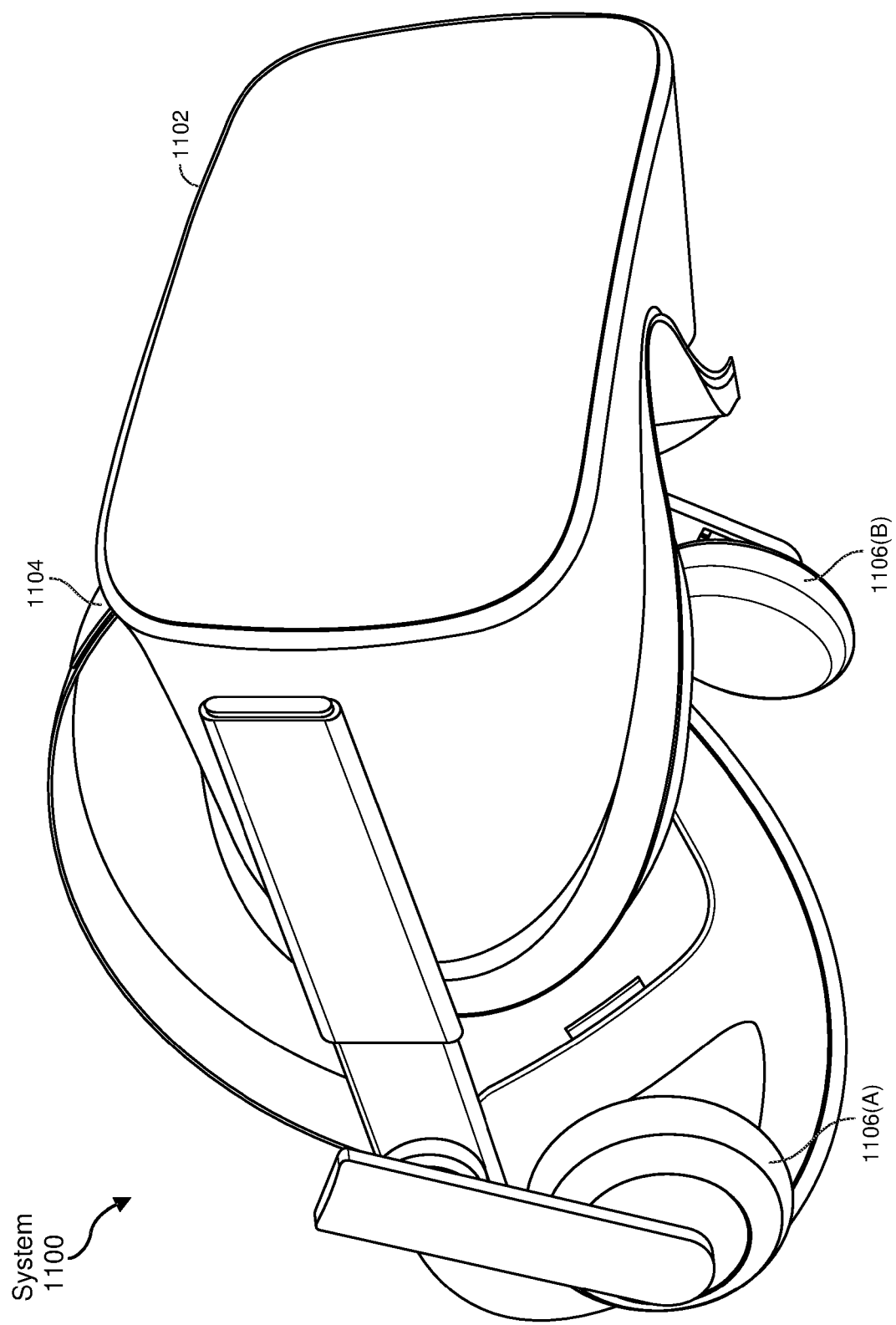
FIG. 11 is an illustration of an exemplary virtual-reality headset that may be used in connection with embodiments of this disclosure.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

In some examples, augmented-reality system 1000 may also include a microphone array with a plurality of acoustic transducers 1020(A)-1020(J), referred to collectively as acoustic transducers 1020. Acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(J) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may be connected to augmented-reality system 1000 via a wireless connection (e.g., a BLUETOOTH connection). In still other embodiments, acoustic transducers 1020(A) and 1020(B) may not be used at all in conjunction with augmented-reality system 1000.

Acoustic transducers 1020 on frame 1010 may be positioned in a variety of different ways, including along the length of the temples, across the bridge, above or below display devices 1015(A) and 1015(B), or some combination thereof. Acoustic transducers 1020 may also be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(*I*) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a polymer thin film that comprises or includes polyvinylidene fluoride include embodiments where a polymer thin film consists essentially of polyvinylidene fluoride and embodiments where a polymer thin film consists of polyvinylidene fluoride.

What is claimed is:

1. A polymer thin film, comprising:
   a crystalline PVDF-family polymer having a molecular weight of at least approximately 100,000 g/mol; and
   an additive having a molecular weight less than the molecular weight of the crystalline PVDF-family polymer, wherein the additive comprises a thiol or an acid and the polymer thin film has an electromechanical coupling factor ($k_{31}$) of at least approximately 0.1.

2. The polymer thin film of claim 1, wherein the crystalline PVDF-family polymer is oriented along a predetermined axis.

3. The polymer thin film of claim 1, wherein the crystalline PVDF-family polymer comprises a moiety selected from the group consisting of vinylidene fluoride, trifluoroethylene, chlorotrifluoroethylene, hexafluoropropene, vinyl fluoride, homopolymers thereof, co-polymers thereof, tri-polymers thereof, and derivatives thereof.

4. The polymer thin film of claim 1, wherein the additive comprises a moiety selected from the group consisting of vinylidene fluoride, trifluoroethylene, chlorotrifluoroethylene, hexafluoropropene, vinyl fluoride, homopolymers thereof, co-polymers thereof, tri-polymers thereof, and derivatives thereof.

5. The polymer thin film of claim 1, wherein the additive comprises one or more of a nucleation agent, a piezoelectric ceramic, and a cation.

6. The polymer thin film of claim 1, wherein the additive comprises a non-reactive moiety selected from the group consisting of an ester, ether, hydroxyl, phosphate, fluorine, halogen, and nitrile.

7. The polymer thin film of claim 1, wherein the additive comprises from approximately 0.1 wt. % to approximately 90 wt. % of the polymer thin film.

8. The polymer thin film of claim 1, wherein the additive has a molecular weight of less than approximately 25,000 g/mol.

9. The polymer thin film of claim 1, wherein the additive has a molecular weight of from approximately 25,000 g/mol to approximately 100,000 g/mol.

* * * * *